US012540491B2

(12) United States Patent
Ryan

(10) Patent No.: US 12,540,491 B2
(45) Date of Patent: Feb. 3, 2026

(54) ELECTRONIC LOCK SYSTEM

(71) Applicant: John Joseph Ryan, Milwaukee, WI (US)

(72) Inventor: John Joseph Ryan, Milwaukee, WI (US)

( * ) Notice: Subject to any disclaimer, the term of this patent is extended or adjusted under 35 U.S.C. 154(b) by 873 days.

(21) Appl. No.: 17/335,951

(22) Filed: Jun. 1, 2021

(65) Prior Publication Data

US 2021/0372165 A1 Dec. 2, 2021

Related U.S. Application Data

(60) Provisional application No. 63/062,166, filed on Aug. 6, 2020, provisional application No. 63/033,571, filed on Jun. 2, 2020.

(51) Int. Cl.
*E05B 15/08* (2006.01)
*E05B 49/00* (2006.01)
*G07C 9/00* (2020.01)

(52) U.S. Cl.
CPC ........ *E05B 49/006* (2013.01); *G07C 9/00944* (2013.01); *G07C 2009/00785* (2013.01)

(58) Field of Classification Search
CPC ........... E05B 49/006; E05B 2047/0028; G07C 2009/00785; G07C 2009/00634
See application file for complete search history.

(56) References Cited

U.S. PATENT DOCUMENTS 3,793,565 A 2/1974 Smith
4,257,030 A 3/1981 Bruhin
4,730,471 A 3/1988 Seckinger
4,761,976 A 8/1988 Kleinhany
5,043,593 A 8/1991 Tsutsumi
5,132,661 A 7/1992 Pinnow
5,319,362 A 6/1994 Hyatt, Jr.
6,384,711 B1 5/2002 Cregger
6,640,594 B1 * 11/2003 Yao .................... E05B 47/0692 70/279.1
6,867,685 B1 * 3/2005 Stillwagon ............. E05B 5/003 292/341.16
8,228,030 B2 7/2012 Pukari
8,626,331 B2 1/2014 Marsh
8,682,468 B2 3/2014 Marsh
(Continued)

OTHER PUBLICATIONS

Willie, Katie, Types of Cylinders—What's the Difference?, Website, Nov. 5, 2013 https://www.locknet.com/newsroom/types-of-cylinders/.

(Continued)

*Primary Examiner* — Vernal U Brown

(57) ABSTRACT

The embodiments presented within provide methods, devices, and systems that improve access control through the use of smart cylinder locks. In one embodiment, a smart cylinder may perform a process including receiving a key, emitting an energy source of electromagnetic radiation; detecting a change in the energy source due to a physical property of the key, determining the physical property of the key from the change in the energy source, comparing the physical property with a predetermined value, and engaging a mechanism operatively coupled to a locking device that allows the locking device to lock or unlock when the physical property matches the predetermined value.

39 Claims, 23 Drawing Sheets

(56) References Cited

U.S. PATENT DOCUMENTS

| | | | | |
|---|---|---|---|---|
| 8,899,081 | B2 | 12/2014 | Pukari | |
| 8,973,417 | B2 | 3/2015 | Bench | |
| 9,406,178 | B2 | 8/2016 | Pukari | |
| 11,639,617 | B1 * | 5/2023 | Farber | E05B 49/006 70/278.7 |
| 2005/0270767 | A1 | 12/2005 | Doong | |
| 2010/0073129 | A1 | 3/2010 | Pukari | |
| 2010/0188190 | A1 * | 7/2010 | Pukari | E05B 47/063 70/357 |
| 2011/0174029 | A1 | 7/2011 | Lappalainen | |
| 2013/0014552 | A1 | 1/2013 | Bench | |
| 2013/0173044 | A1 | 7/2013 | Marsh | |
| 2015/0107316 | A1 * | 4/2015 | Kirkjan | G07C 9/00309 |
| 2016/0326772 | A1 | 11/2016 | Denson | |
| 2017/0039447 | A1 * | 2/2017 | Mutch | B23C 3/35 |
| 2017/0152677 | A1 * | 6/2017 | Klammer | E05B 47/0044 |
| 2023/0082628 | A1 * | 3/2023 | Horsfall | G01B 11/2518 348/86 |

OTHER PUBLICATIONS

Viderberg, Arvid, Security evaluation of smart door locks, Paper, Jun. 17, 2019, Examensarbete Inom Informationsteknik, Avancerad Nivå, 30 HP Stockholm, Sverige 2019.

Kiana Montazeri, Marc Currie, Louisiane Verger, Pouya Dianat, Michel W. Barsoum, Bahram Nabet. Beyond Gold: Spin-Coated Ti 3 C 2 -Based MXene Photodetectors. Advanced Materials, 2019; 31 (43): 1903271 DOI: 10.1002/adma.201903271.

Charitos< Panos, Designing pixel readout chips at CERN: From dream to reality. Newsletter, Oct. 17, 2013 https://ep-news.web.cern.ch/content/designing-pixel-readout-chips-cern-dream-reality.

* cited by examiner

ELECTRONIC LOCK SYSTEM

The present disclosure is directed to a lock system, specifically an electronic lock system. The present application claims priority to U.S. Provisional Application 63/033,571 filed Jun. 2, 2020 and U.S. Provisional Application No. 63/062,166 filed Aug. 6, 2020, the entire disclosures of which are incorporated herein by reference.

FIELD

Background

Door locks are by far one of the most common security measures in both residential and commercial settings. The basic structure of locks has not changed in several hundred years. A user seeking to open a door inserts a key with an irregular, toothed shape into the lock. The teeth correspond to, and physically interact with, pins in the lock. If all of the pins are raised to the correct level by their corresponding key teeth, the user can disengage the locking mechanism. While this system has enjoyed widespread use, it does have limitations. Because only one configuration of teeth may open a given lock, if a key is lost, copied, or stolen, then the lock is no longer secure. Once that happens, the entire lock must be replaced or rekeyed, with new keys given to all users, a cumbersome and time consuming process. Because the lock is purely mechanical in nature, it does not create an entry record of who opened a door or when it was opened.

A physical lock face typically must be strong with a high hardness to endure malicious attacks. In some locks, this is achieved by adding small steel pieces to a brass lock face where it would be easy to drill and bypass. In other locks, the full face is made out of strong steel to be able to protect the entire face.

In regards to radio-frequency identification (RFID) locks, an electromagnetic signal is not able to pass through a plane of metal. As such, one common solution is to use a plastic face with the RFID reader with the locking mechanism attached on the inside of the door lock. If the plastic face is drilled through, the actual locking mechanism is not readily available. Some other locks use glass. One lock uses Gorilla Glass, a chemically strengthened glass developed by Corning. Glass is amorphous and progressively softens under heat.

Users have attempted to solve these problems through the use of electronic locks, which require a token, code, biometric input, or other unique identifier to open. Because these systems are electronic, they require a power source, such as line power or batteries. If the lock's batteries run out or it is cut off from power lines, then the lock becomes useless. A combination lock may have its code given out to other unauthorized users. A keycard for a lock may get confused with other cards or lost. Furthermore, the locks do not fit conventional door knobs and must be specially installed.

There is an unmet need in the art for an electronic lock system that can be retrofit to existing doors and lock systems and that solves the problems above.

SUMMARY

The embodiments presented within provide methods, devices, and systems that improve access control through the use of locks. Some embodiments presented include mortise and key-in-knob form-factor locks.

In one embodiment, a smart cylinder may perform a process comprising receiving a key, emitting an energy source of electromagnetic radiation; detecting a change in the energy source due to a physical property of the key, determining the physical property of the key from the change in the energy source, comparing the physical property with a predetermined value, and engaging a mechanism operatively coupled to a locking device that allows the locking device to unlock when the physical property matches the predetermined value.

In another embodiment, a smart cylinder may implement the energy source as light.

In another embodiment, a smart cylinder may implement the physical property of the key as the shape of the key.

In another embodiment, the key is designed to work in any combination of a traditional pin-tumbler, a wafer-tumbler, a disc-tumbler, and a lever-tumbler.

In another embodiment, the energy source is emitted from an energy emission array and wherein the change in the energy source is detected in an energy detection array.

In another embodiment, the energy source is polarized in a polarizing filter.

In another embodiment, the energy source is unique to a particular smart cylinder.

In another embodiment, the key is received in a keyway.

In another embodiment, the change in the energy source is measured in a two-dimensional array of sensors.

In another embodiment, a smart cylinder further implements the process of engaging the mechanism through an electromagnetic device at least partially housed in the smart cylinder; and powering the smart cylinder with energy generated in the electromagnetic device when configured to function as a generator.

In another embodiment, the physical property of the key is the shape of two or more sides of the key.

In another embodiment, the smart cylinder is designed to fit into a traditional and standardized lock cylinder.

In another embodiment, the change in the energy source is measured in one or more of a pixel sensor, a MXene photodetector, a charged couple device, a Medipix sensor, a complementary metal oxide semiconductor sensor, a photodiode sensor, and a photo-pixel array.

In another embodiment, the change in the energy source measures one or more of the properties of shadow thrown by the key, reflection of light off the key, capacitance of an area of the key, and conductivity of an area of the key.

In another embodiment, a smart cylinder may implement a process of receiving a key in a keyway; generating power through a rotation of the key in the keyway; storing the power in a storage device; operating the smart cylinder with the power.

In another embodiment, a smart cylinder may implement a process of receiving a key in a keyway; generating power through a translation of the key in the keyway; storing the power in a storage device; operating the smart cylinder with the power.

In another embodiment, the storage device is internal to the smart cylinder.

In another embodiment, the power is generated in a coil of wire and the coil of wire is supplied with power for engaging a locking mechanism.

In another embodiment, the smart cylinder may implement a process of receiving power through an inductive antenna, storing the power in a storage device, and operating the smart cylinder with the power.

In another embodiment, a smart cylinder may implement a process of receiving a unique identification from a combination of two or more of key, radiofrequency identification, ultra-wideband signal, and biometric derived identification; and engaging a mechanism operatively coupled to a locking device that allows the locking device to unlock when the unique identification matches a predetermined value.

In another embodiment, a smart cylinder may implement a process of receiving a set of information about a key; performing a mathematical function on the set of information; comparing the results of the mathematical function with a predetermined value; and engaging a mechanism operatively coupled to a locking device that allows the locking device to unlock when the unique identification matches a predetermined value.

In another embodiment, a smart cylinder may implement a process of receiving an unlock code from a central server on a communication band; and engaging a mechanism operatively coupled to a locking device that allows the locking device to unlock when the unlock code matches a predetermined value.

In another embodiment, a smart cylinder may implement a process of measuring a rotation of a knob; comparing an angle of the rotation with a predetermined value; and engaging a mechanism operatively coupled to a locking device that allows the locking device to unlock when the angle of the rotation matches the predetermined value.

In another embodiment, a smart cylinder may implement a process of recognizing a first key with a first physical characteristic, entering a programming mode, accepting a second key with a second physical characteristic, and recording the second key as a valid key for engaging a mechanism.

DETAILED DESCRIPTION

Representative embodiments are described below with reference to the accompanying drawings. It should be understood that the following description is intended to describe representative embodiments, and not to limit the appended claims. In the present description, certain terms have been used for brevity, clearness and understanding. No unnecessary limitations are to be applied there from beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

In one aspect, the system's self-powering smart cylinder can allow home and business owners to transform any mechanical lock system into a highly secure smart lock. Once installed, users can typically program permanent or temporary access to any existing access devices, such as, but not limited to, physical keys, radiofrequency identification (RFID) devices, or smartphones. Electronic sensors placed in the smart cylinder may scan and store physical keys' profiles, allowing owners to digitally manage, track, and grant access.

Locks within the system may be self-powered and backward-compatible with existing door hardware. In one aspect, this "turn-key" solution allows users to quickly transform their mechanical entry system into a smart lock system. Additionally, when networked, these locks can incorporate other access methods such as, but not limited to, RFID, Bluetooth, and biometric verification and function as a security access monitoring system that generates valuable entry data. An access management system typically enables users to manage, store, and share the digital signature of their users through their management network. In addition, users can manage and share their own physical and RFID keys' access with their own digital profiles.

Figure 1:
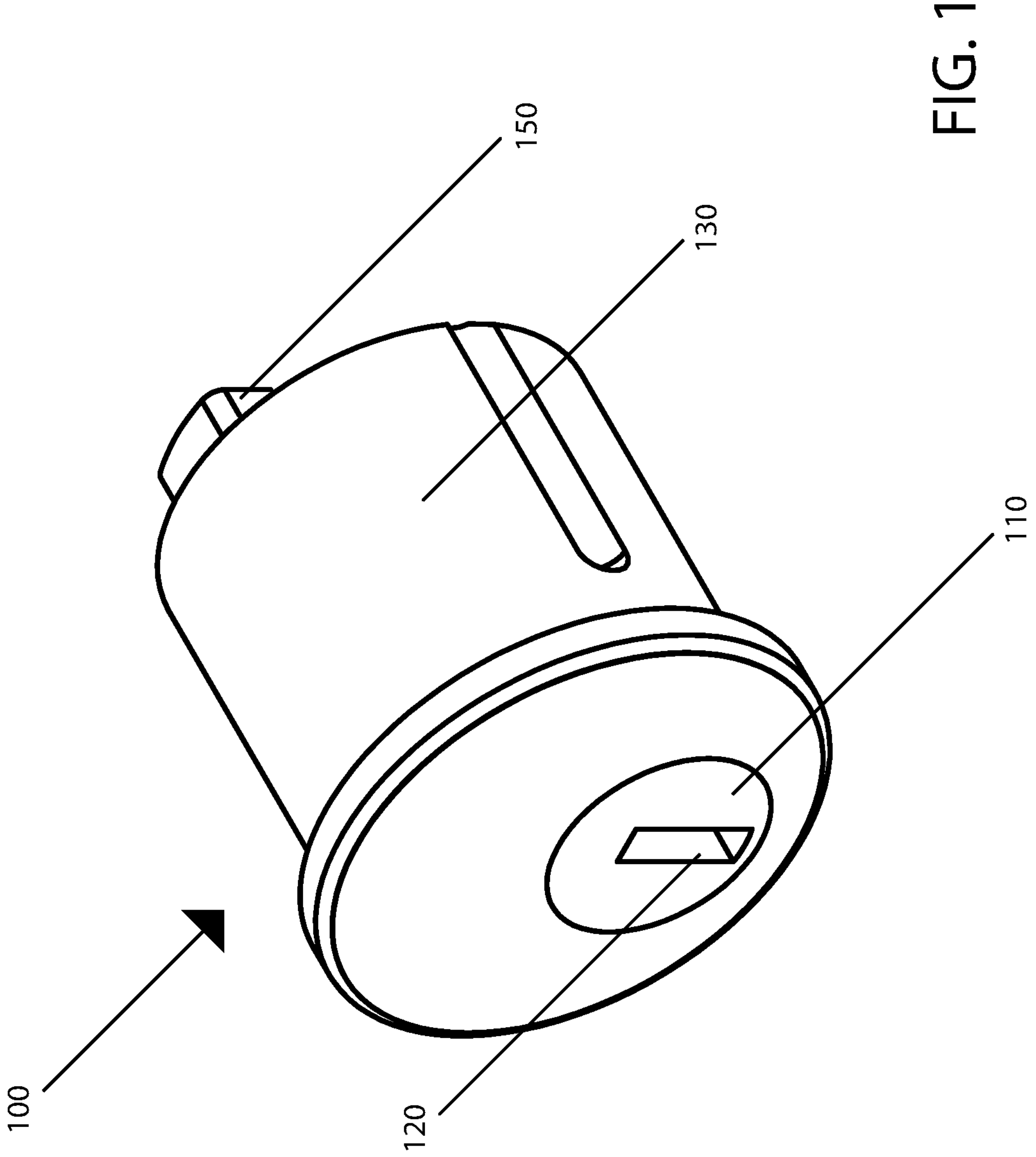
FIG. 1 is an illustration of one embodiment of a smart cylinder.

FIG. 1 is an illustration of one embodiment of a smart cylinder 100. The smart cylinder 100 may comprise a plug 110 with a keyway 120, a cylinder body 130 with possible threading or guides, and a lock cam 150. Smart cylinder 100 is in the form factor of a mortise lock, but other form factors are possible. The smart cylinder 100 may be configured to fit other traditional or standardized lock cylinders like, but not limited to, mortise, key-in-knob (KIK), euro cylinder, oval cylinder, and interchangeable core cylinders.

Figure 2:
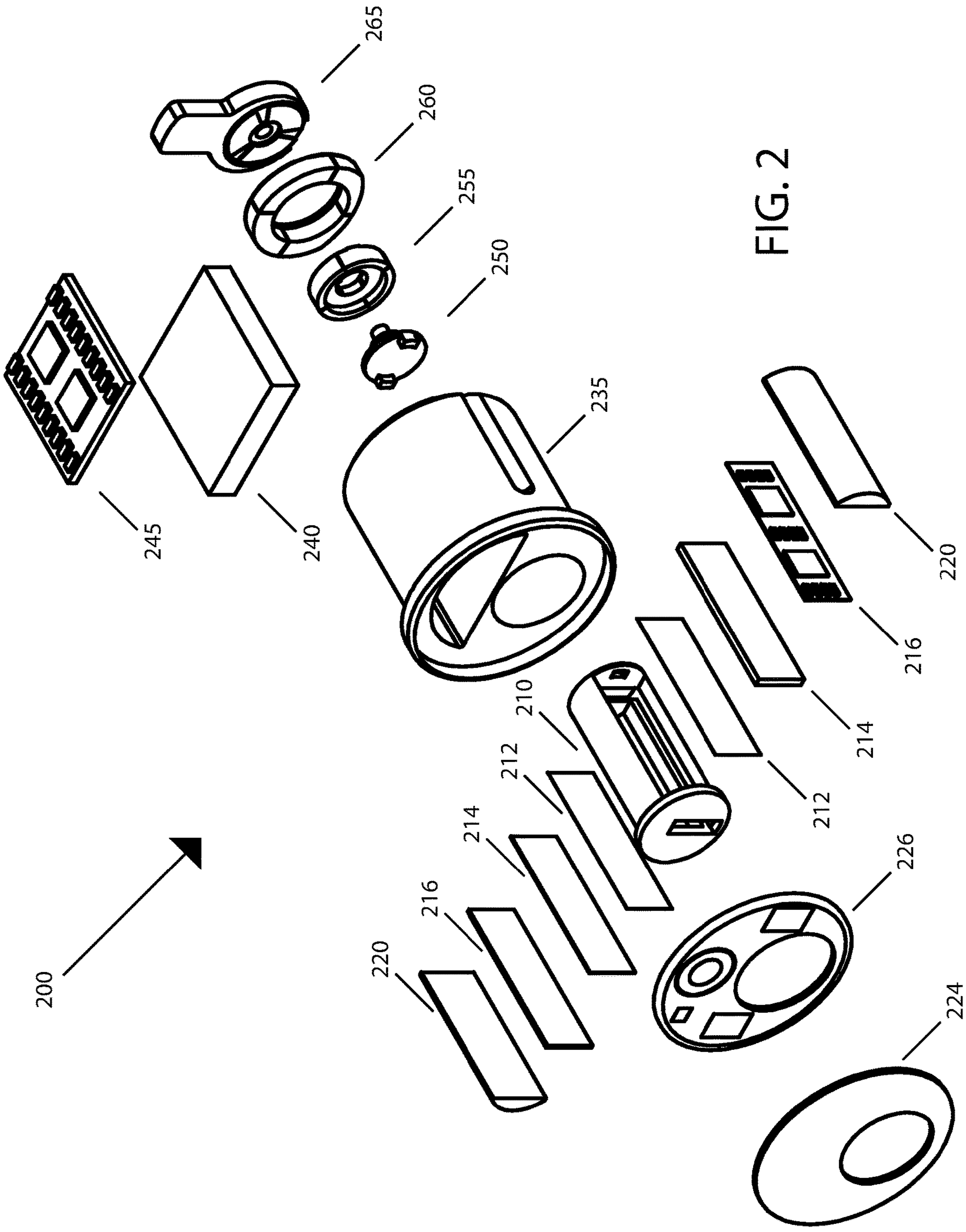
FIG. 2 is an illustration of components that comprise one embodiment of a smart cylinder.

FIG. 2 is an illustration of components that comprise one embodiment of a smart cylinder 200. A plug body 210 comprises one or more polarizers 212, one or more emitter/detector arrays 214, and one or more emitter/detector control modules 216. Different configurations of these components are also considered as part of other embodiments. The plug body 210 components are contained by plug covers 220. The plug body 210, cylinder faceplate 224, and communication board 226 are contained in cylinder housing 235.

Power storage 240 is also contained in cylinder housing 235 and may comprise a combination of capacitors, batteries and other power storage options. Control board 245, also called a control module, typically controls and is operatively coupled to the various components of the smart cylinder and connects and distributes power throughout the device. In combination with communication board 226, control board 245 may collect, rectify, and store energy created within or by the smart cylinder 200. Clutch shaft 250, rotor 255, stator 260, and lock cam 260 with integrated clutch pressure plate allow the lock to turn mechanical linkages that engage the lock. When generating power, plug body 210 typically spins freely, generating electrical energy from the movement of the rotor 255 relative to the stator 260. The energy can be collected, rectified, and stored by the control board 245 in the power storage 240. Other configurations of these elements are also considered as part of other embodiments.

Figure 3:
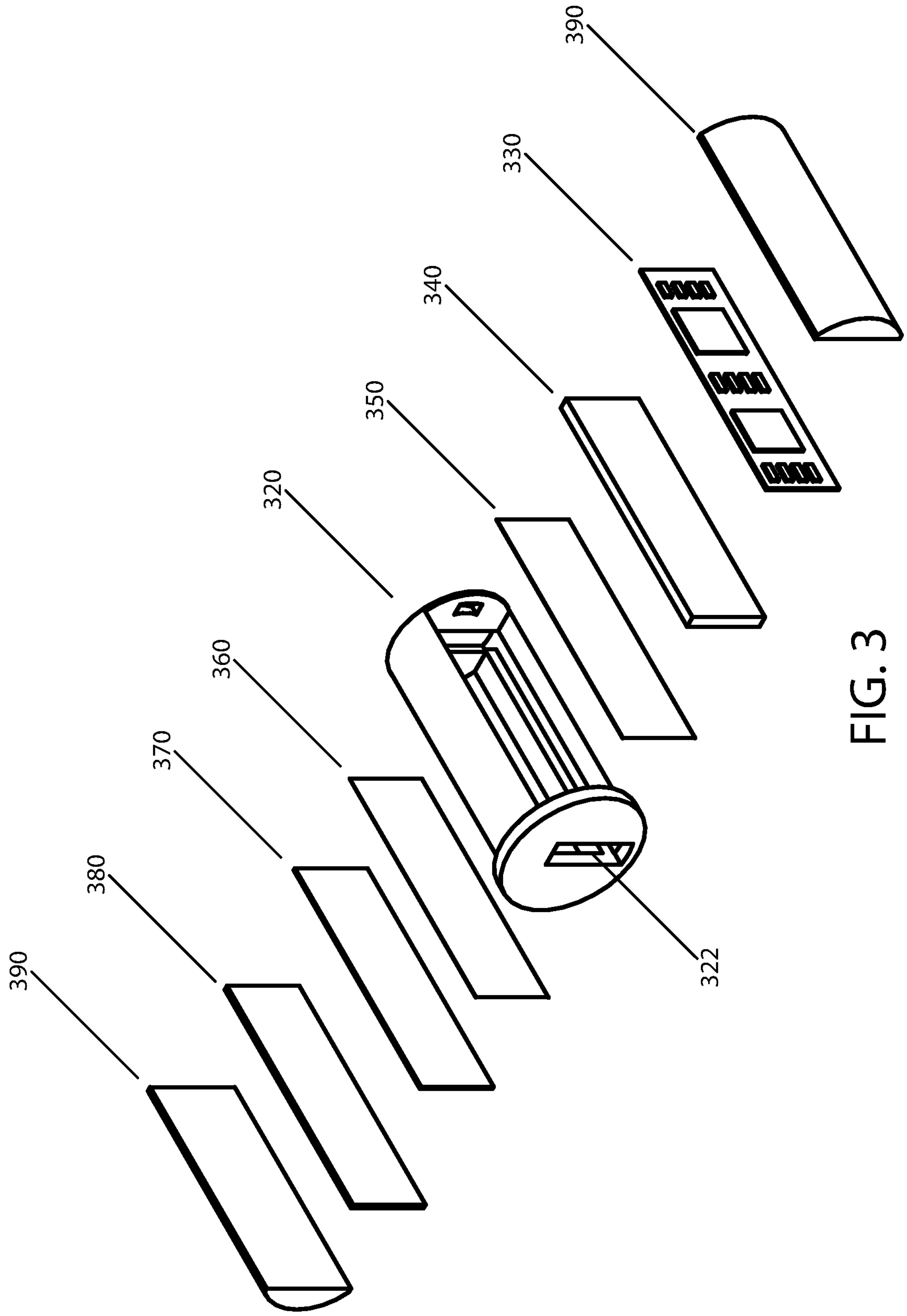
FIG. 3 is an illustration of one embodiment of a plug in a smart cylinder.

FIG. 3 is an illustration of one embodiment of a plug in a smart cylinder. The plug typically includes a plug body 320 with an optional keyway 322. The plug body 320 further comprises an energy emission control board 330, energy emission array 340, optional emission filter 350, optional detection filter 360, energy detection array 370, energy detection control board 380, and plug covers 390. The optional emission filter 350 and the optional detection filter 360 may be polarizing filters, collimator filters, or other emissions conditioning filters.

In operation, the energy emission control board 330 or a remote control module may activate and control energy emission from the energy emission array 340. The energy emission array 340 is one form of energy emitter and produces and emits electromagnetic energy, whether in the form of visible spectrum light, ultraviolet light, infrared light, high frequency radio waves, or any other energy form detectable by the energy detection array 370. The emission of this energy may be produced equally or in regular pattern from a two-dimensional array of emitters. The duration of energy emission may range from a brief flash to sustained illumination. The emission can be unique to each smart cylinder or designed such that it is consistent across all units or a subset thereof.

When a key is received and the energy emission array 340 is activated, the energy detection board 380 receives data from and controls the energy detection from the energy detection array 370 or other energy detector. The energy detected is changed from the emitted energy due to physical properties of the key. The energy detection array 370 may be a sensor or array of sensors that are able to detect the presence and magnitude of energy produced from the energy emission array 340. The sensors of the energy detection array 370 may be configured to be linear, two-dimensional, or in other configurations that focus on the measured characteristics of the key. Potential types of sensors include, but are not limited to, any combination of pixel sensors; 2D transition metal carbides, nitrides, and carbon nitrides (MXene) photodetectors; charge-coupled devices (CCD); Medipix sensors; complementary metal-oxide-semiconductors (CMOS), photodiode sensors, and a photo-pixel array. Other sensor types may be used, some of which may be better for detecting other forms of electromagnetic radiation. Physical properties of the key may then be deduced from the energy detected. Some physical properties that may be measured, without limiting to only these physical properties, include the shadow thrown by the key, reflection of light off the key, capacitance of an area of the key, conductivity of an area of the key, the color of areas of the key, and so on. Different configurations of the emitters and sensors may digitize two or more sides of a key.

Figure 4:
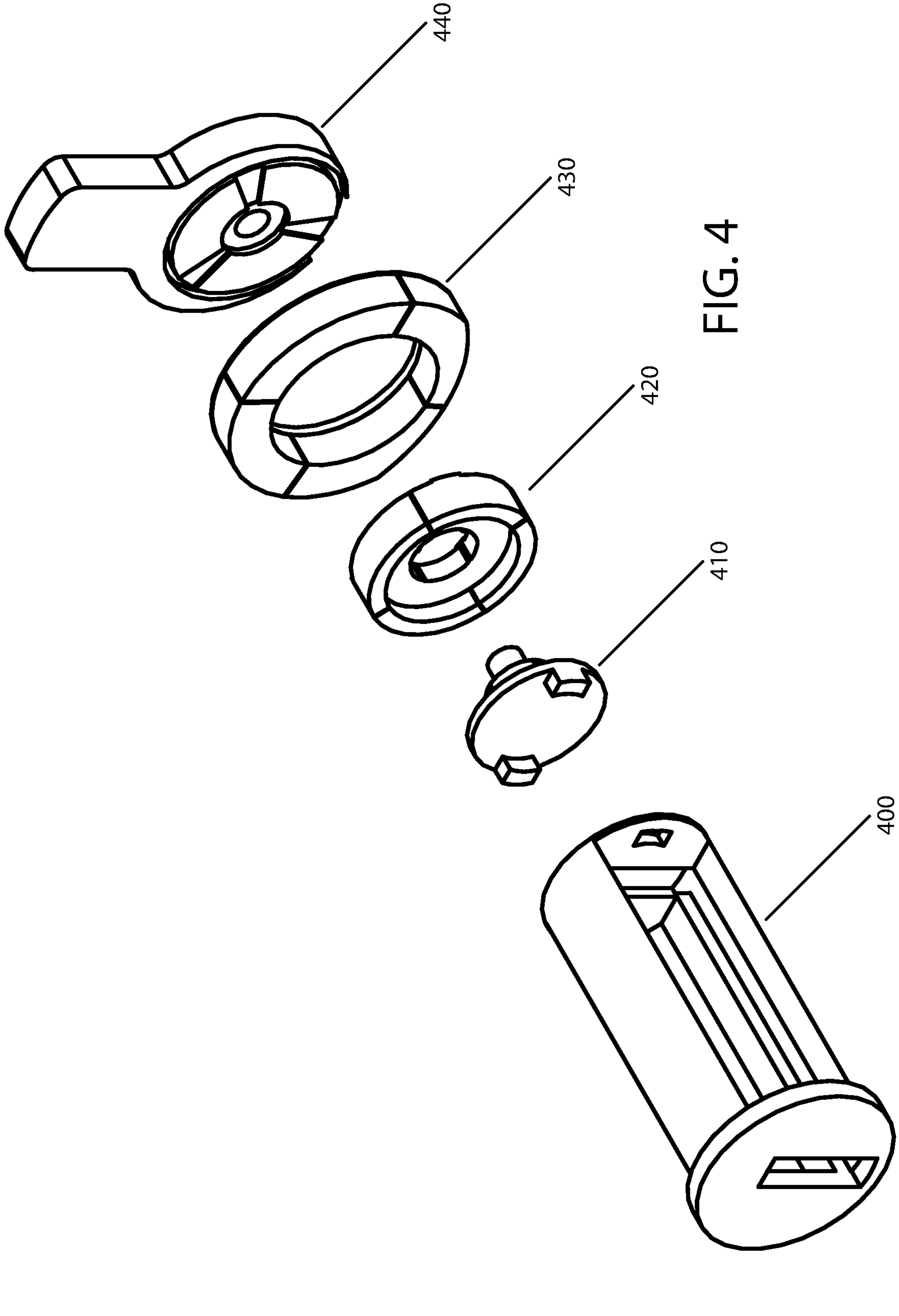
FIG. 4 is an illustration of the clutch and generator of a smart cylinder.

FIG. 4 is an illustration of the clutch and generator of a smart cylinder. Plug 400 is shown in relation to clutch shaft 410, rotor 420, stator 430, clutch 435, and lock cam 440. Clutch shaft 410 has a plate surface that connects to plug 400. Lock cam 440 has an integrated clutch pressure plate that binds to the rotor. The rotor 420 and lock cam 440 may bind through mechanical teeth or through friction. Other clutch mechanisms are possible.

Figure 5:
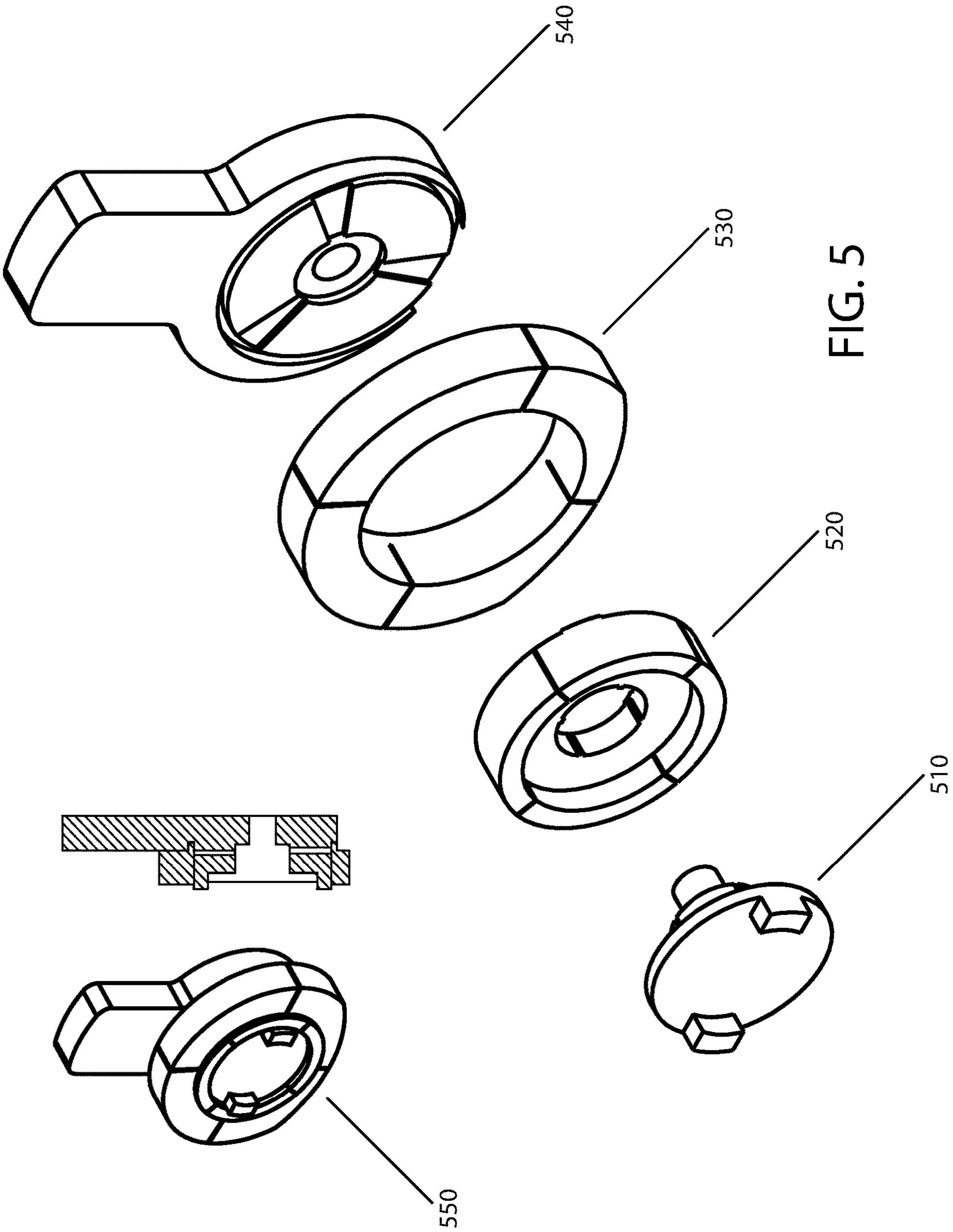
FIG. 5 is an illustration of the clutch and generator of a smart cylinder as engaged.

FIG. 5 is an illustration of the clutch and generator of a smart cylinder as engaged. Clutch shaft 510 engages electromagnetic rotor 520 which becomes magnetized and sets up a magnetic loop that attracts the driven clutch 540. The driven clutch 540 can be pulled against the rotor 520, generating a frictional force at contact. Alternatively, the rotor 520 may be pulled against the driven clutch 540, generating a frictional force at contact. Instant friction can be achieved through the contacting surfaces of the rotor 520 and the driven clutch 540 resembling correspondingly geared teeth. Driven clutch 540 drives a cam which is mechanically coupled to a locking mechanism. The clutch and generator may be fully or partially housed in the smart cylinder or could be remote to the smart cylinder but operatively coupled to the smart cylinder. Thus, the cam may be engaged when the smart cylinder determines a key matches a predetermined value allowing the smart cylinder to lock or unlock the locking mechanism.

The clutch of the smart cylinder may also be used for power generation. Any coil of wire, in the presence of a moving magnetic field, will create power that can be rectified and used. In one implementation, stator 530 can be powered to generate a magnetic field. When rotor 520 is rotated by the action of the user, a current is generated that can be rectified and stored in power storage, later or simultaneously using this power to power the smart cylinder. In another implementation, stator 530 may be implemented as a permanent magnet. In another implementation, rotor 520 may be used to generate the magnetic field, either through an electromagnet or through a permanent magnet, and stator 530 may generate power. In this implementation, either the clutch may be engaged and thereby turn the lock mechanism, or the magnetic field can be selected to be weak enough to not engage the clutch.

Figure 6:
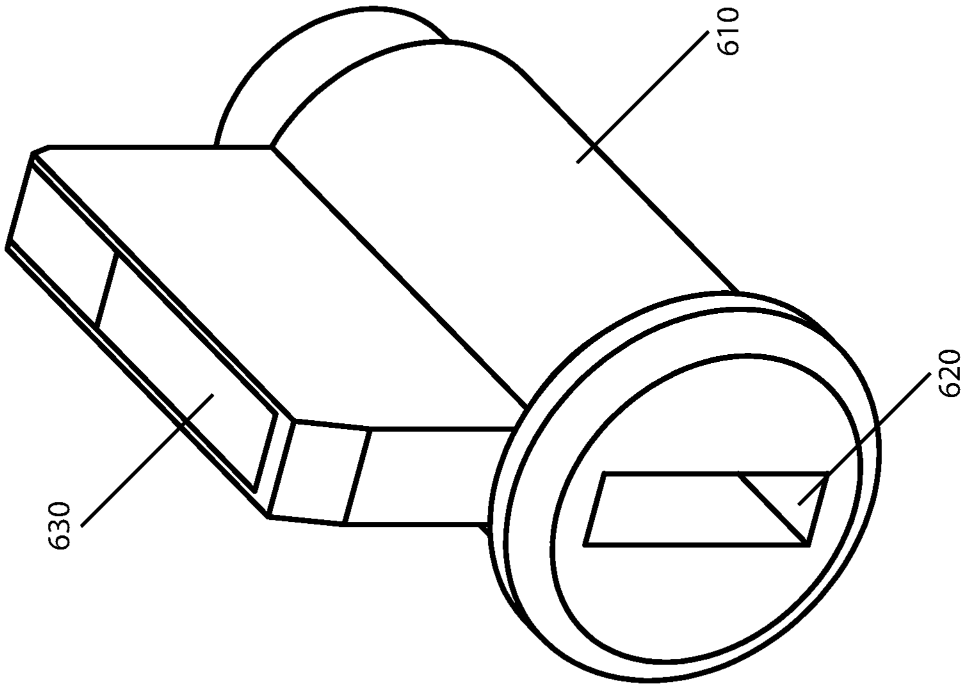
FIG. 6 is an illustration of an embodiment of a smart cylinder in a different form factor, in this case for a key-in-knob or KIK cylinder.

FIG. 6 is an illustration of an embodiment of a smart cylinder in a different form factor, in this case for a key-in-knob or KIK cylinder. The smart cylinder can be built to be compatible with many different form factors including mortise, rim, and the illustrated KIK form factor. Cylinder body 610 with keyway 620 is coupled with solenoid 630 as the locking mechanism. In this implementation of the smart cylinder, a clutch mechanism is not required since the lock is engaged with solenoid 630. Solenoid 630 may be implemented as a bistable, or latching, solenoid. Other electromechanical mechanisms for actuating the locking mechanism are possible.

Figure 7:
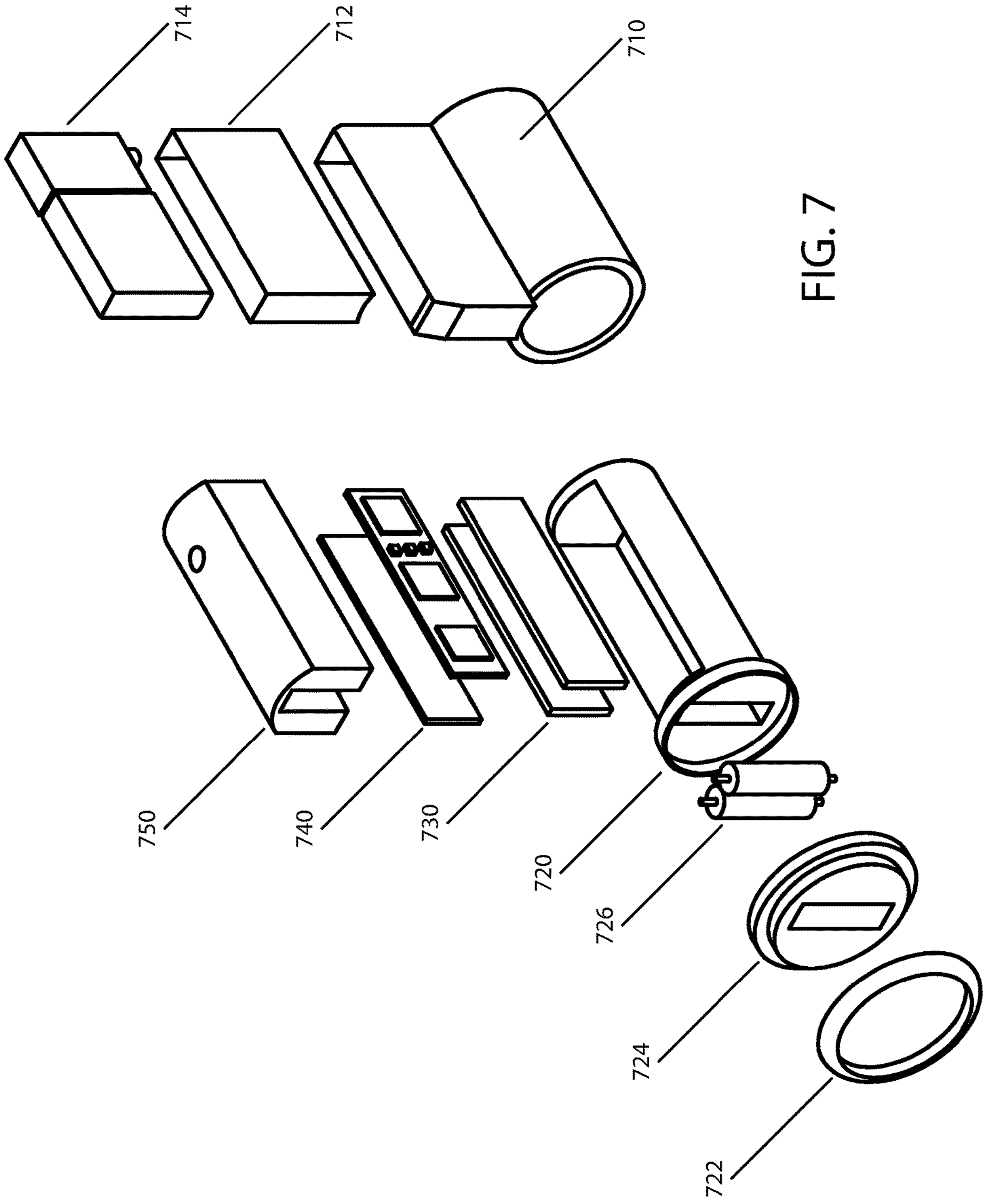
FIG. 7 is an illustration of an exploded view of the embodiment in the KIK cylinder form factor.

FIG. 7 is an illustration of an exploded view of the embodiment in the KIK cylinder form factor. Cylinder body 710, solenoid 712, and solenoid core 714 are shown. Also shown, plug body 720 comprises display ring 722, cover 724, external radiation filter 726 or plug sheath designed to prevent outside light or foreign objects from entering the smart cylinder, emission and detection arrays 730, control boards 740, and housing cover 750. Once key scanning is complete and the key profile accepted the solenoid 712 is energized releasing solenoid core 714 and allowing rotation of the plug body 720 to unlock the door.

Figure 8:
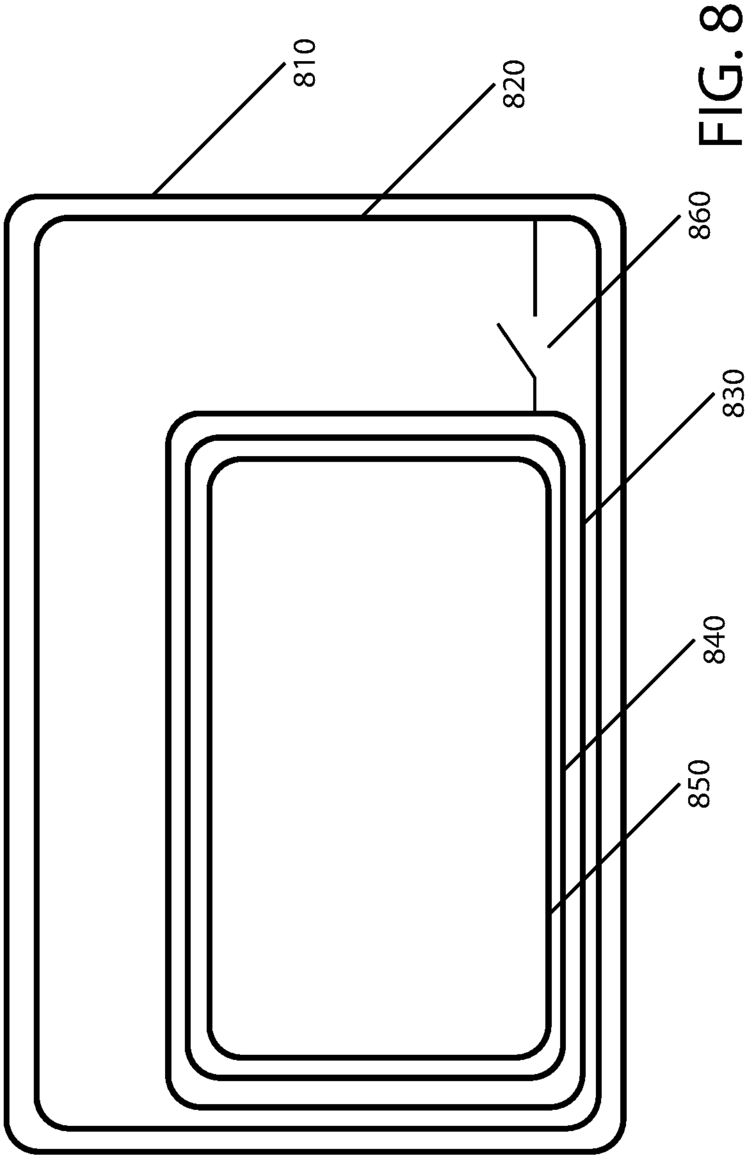
FIG. 8 is a schematic illustration of an antennae complex used for communication and charging of a smart cylinder.

FIG. 8 is a schematic illustration of an antennae complex used for communication and charging of a smart cylinder. Depicted are antenna 810, antenna 820, antenna 830, antenna 840, and antenna 850 with switch 860 allowing antenna 830 to be coupled to antenna 820. The antenna may be different sizes to allow the best use of incident radiation, either for inductive powering via an inductive antenna of the smart cylinder or for communication on many different frequencies.

There are several different RFID frequencies a smart cylinder may typically use. Generally, the most common are low frequency (LF) (125 to 134 kHz), high frequency (HF) (13.56 MHz), and ultra-high frequency (UHF) (433 MHz, and 860 to 960 MHz). The multiple antennae associated with the smart cylinder allow the system to switch between different frequencies of transmission when a passive or active tag is detected. As a result, the smart cylinder may accomplish dual functionality with a smaller package size. In one embodiment, antenna may simultaneously detect and read RFID tags at two different frequencies (for example, but not limited to, 125 kHz and 13.56 MHz). Antenna 830 could operate at a desired frequency until switch 860 is closed and then transmit at a different desired frequency. The functionality can increase security as an access-only RFID tag can use the first frequency while an RFID tag that allows access to the programming of the smart cylinder can use a second frequency.

The smart cylinder may also use Bluetooth, a wireless technology standard used for exchanging data between fixed and mobile devices over short distances using short-wavelength UHF radio waves in the industrial, scientific and medical radio bands, from 2.402 GHz to 2.480 GHz, and building personal area networks (PANs). Bluetooth Low Energy or RSL10 provide considerably reduced power consumption and cost while maintaining a similar communication range. The smart cylinder can use these standards to optimize battery life.

The smart cylinder may combine information from two or more identification sources such as a physical key, an RFID, an ultra-wideband signal, a biometric identification characteristic, or other use specific device. Thus, security is increased by requiring authentication through more than one means. Additionally, smart cylinders may be programmed to only work at certain times or when another person is present or when the lock has been activated within a predetermined window of time by a different credential. The presence of another person can be detected through external means and conveyed to the smart lock or may be detected directly through reception of radiofrequency signals or biometric data that indicates the person's presence.

The smart cylinder may be programmed either from an external source or through operation of the lock with preconfigured keys. For example, a first key with a predetermined physical characteristic can be inserted into the lock, putting the lock into programming mode. Then a second key may be inserted to program the physical characteristics of the key into the lock as an authorized key. A similar technique can be used to require two keys in order to operate a lock. A first key can be inserted and recognized as authorized but insufficient to open the lock. Then a second key can be inserted and recognized as authorized, allowing the lock to be engaged or disengaged. The system can required a predetermined time between the first key and the second key to ensure the two keys are presented within close proximity. Similarly, an otherwise authorized key may be disabled if a first key has been used within a predetermined time window. This can keep two people from being allowed to enter a space at the same time.

Figure 9:
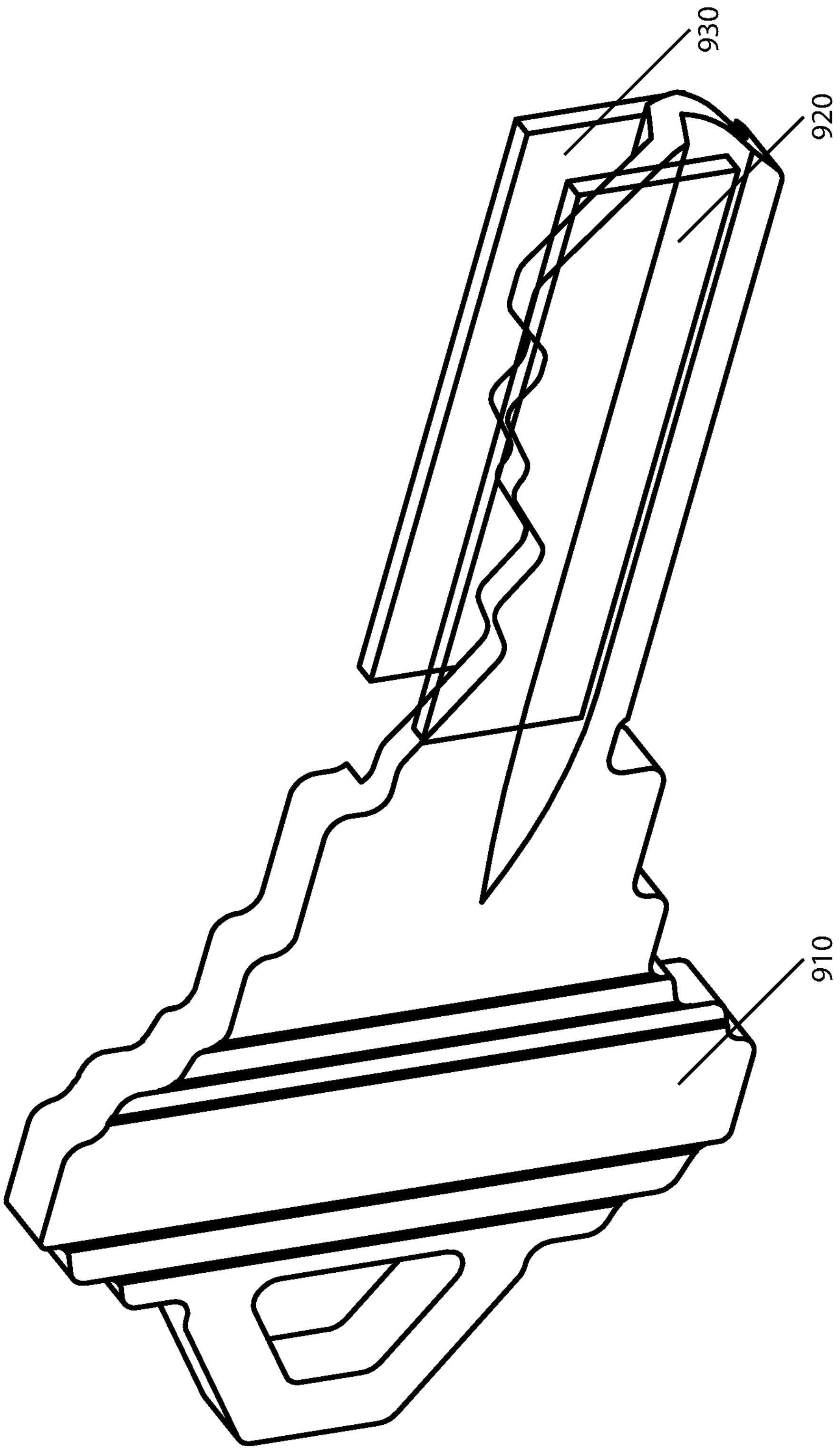
FIG. 9 is an illustration of one configuration for scanning a physical key.

FIG. 9 is an illustration of one configuration for scanning a physical key. Key 910 is inserted in a keyway, not shown, between emitter module 920 and detector module 930. Emitter module 920 may comprise a Light Emitting Diode (LED) array, an emitter control module, and a polarizer, though fewer components may also be used. Detector module 930 may comprise a photodiode sensor, a photo-pixel array, or any of the otherwise considered sensor elements. Detector module 930 may also include a polarizer and a detector control module. Characteristics measured may include mechanical, electrical, or metallurgical features found in the key depending on the scanning method implemented.

Figure 10:
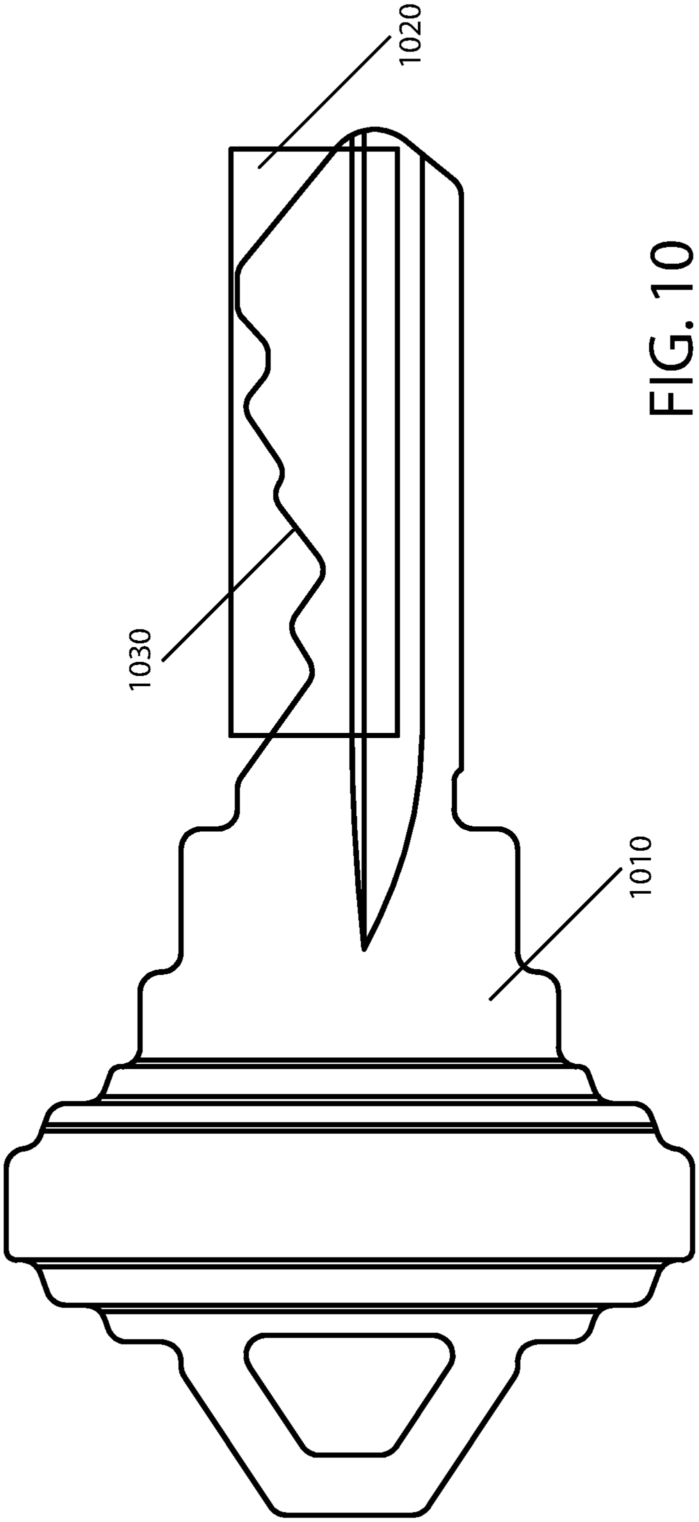
FIG. 10 is an illustration of a plan view of the key 1010 and detector area 1020 that highlights an area of the key 1030 that is being digitized.

FIG. 10 is an illustration of a plan view of the key 1010 and detector area 1020 that highlights an area of the key 1030 that is being digitized. In other configurations, other parts of the key may be digitized and compared. This aspect of the digitization is detailed to give the practitioner an understanding of the overall process.

Figure 11:
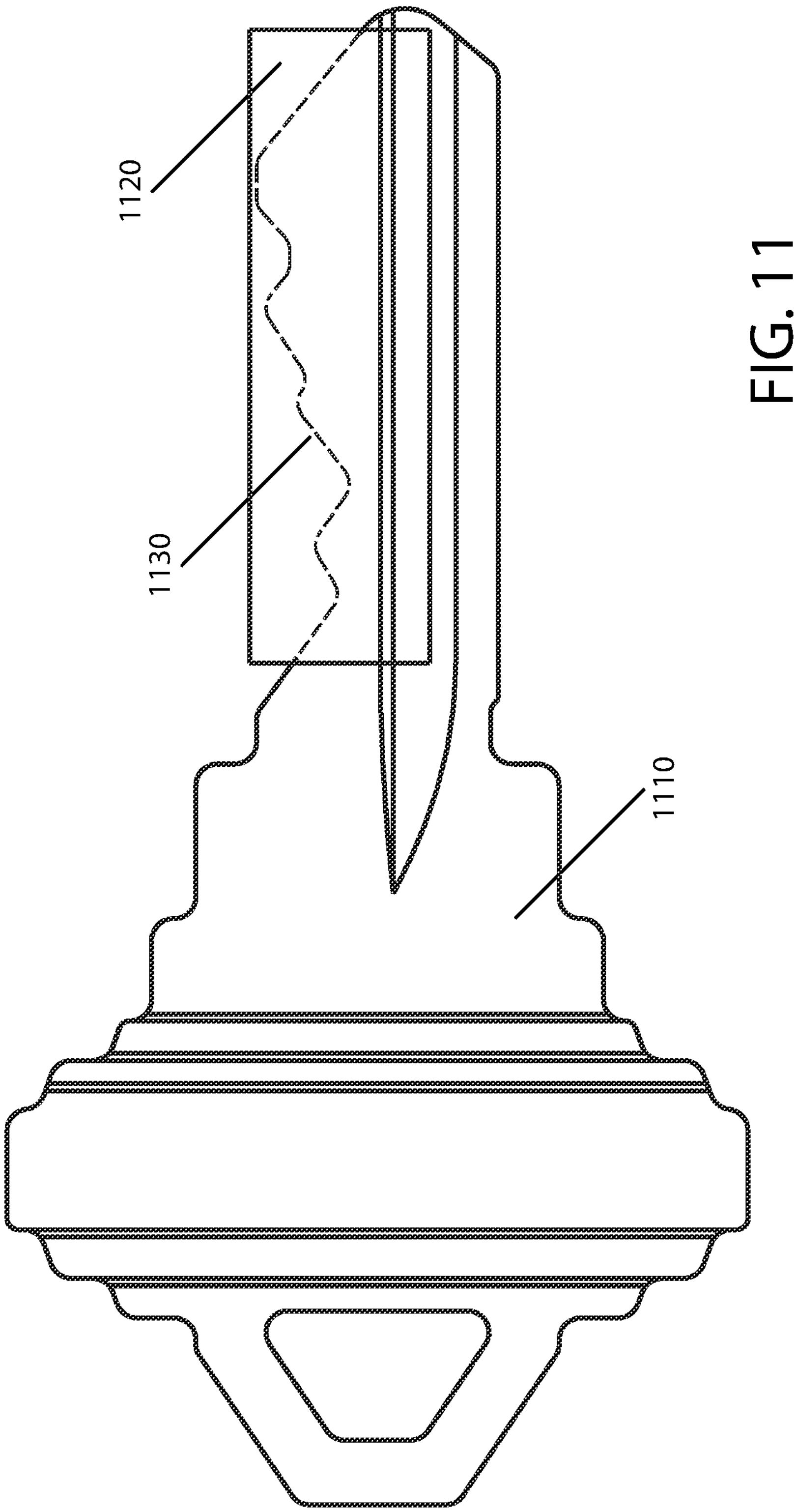
FIG. 11 is an illustration that highlights an approach for digitizing a key.

FIG. 11 is an illustration that highlights an approach for digitizing a key. In this approach, the key 1110 is scanned in area 1120 to determine the physical shape of the edge 1130 of the key. Hence, it is measuring characteristics that are analogous to what a mechanical lock measures. However, it points out a significant improvement on the mechanical lock. A mechanical lock is limited to measuring a key where each pin or cam interacts with the key, generally only five or six points. The present method measures a key at many more points, limited only by the resolution of the sensor. The present method can simultaneously measure one or more of traditional characteristics of keys: the characteristics that interact with pin-tumblers, wafer-tumblers, disc-tumblers, lever-tumblers, and other traditional key characteristics. Additionally, the present method may measure many more qualities of the key than simply it shape. Some qualities include, but are not limited to, shape, reflectivity, conductivity, capacitance, color, temperature, composition, and other physical properties of the key.

Figure 12:
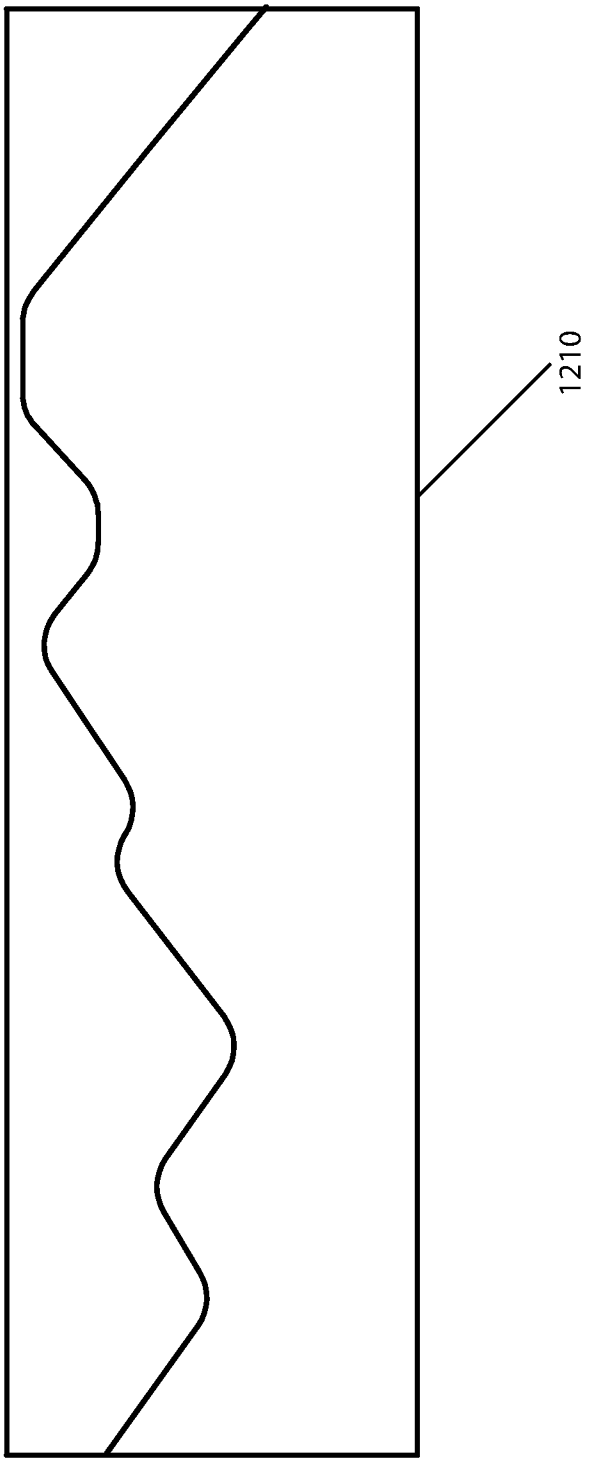
FIG. 12 is an illustration of the image of the portion of the key digitized.

FIG. 12 is an illustration of the image of the portion of the key digitized. The illustration shows the much finer grain of detail available with the smart cylinder over that available to a mechanical lock. Photogrammetric methods are used to digitize the key to scale.

Figure 13:
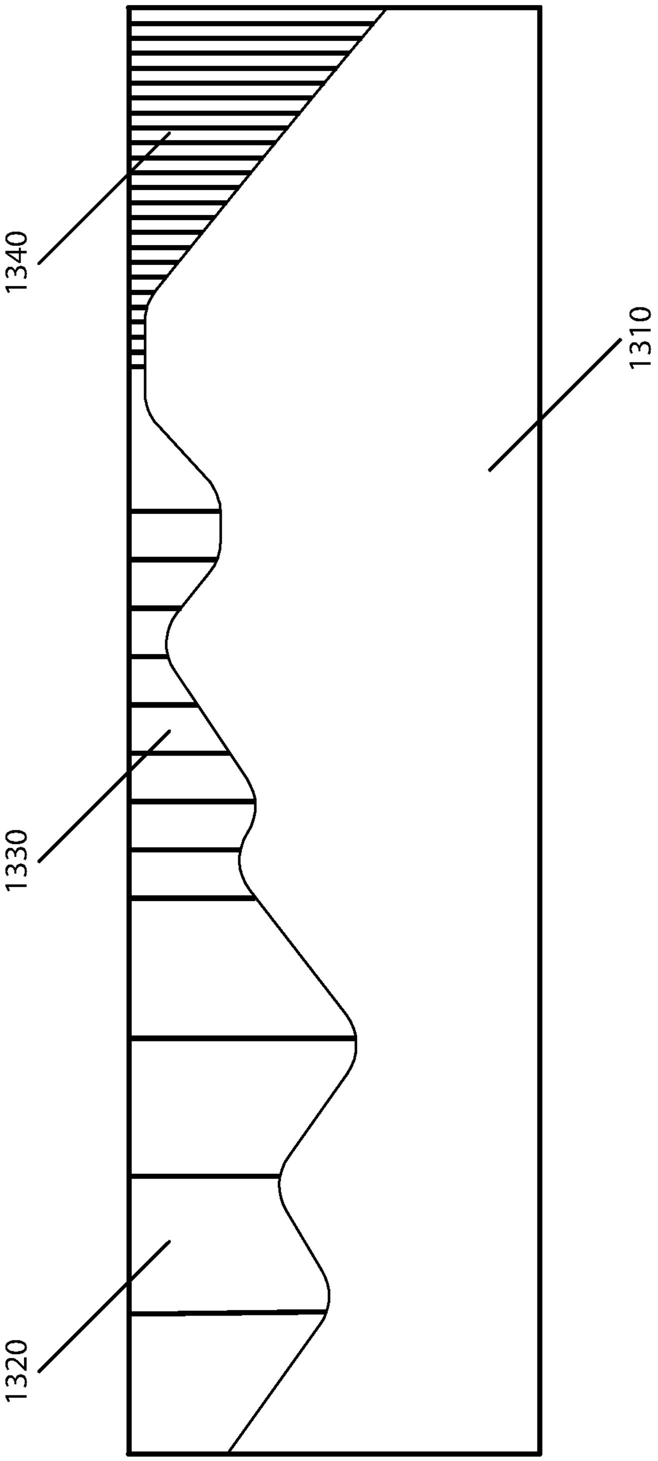
FIG. 13 is an illustration of a linear system of digitization.
Figure 14:
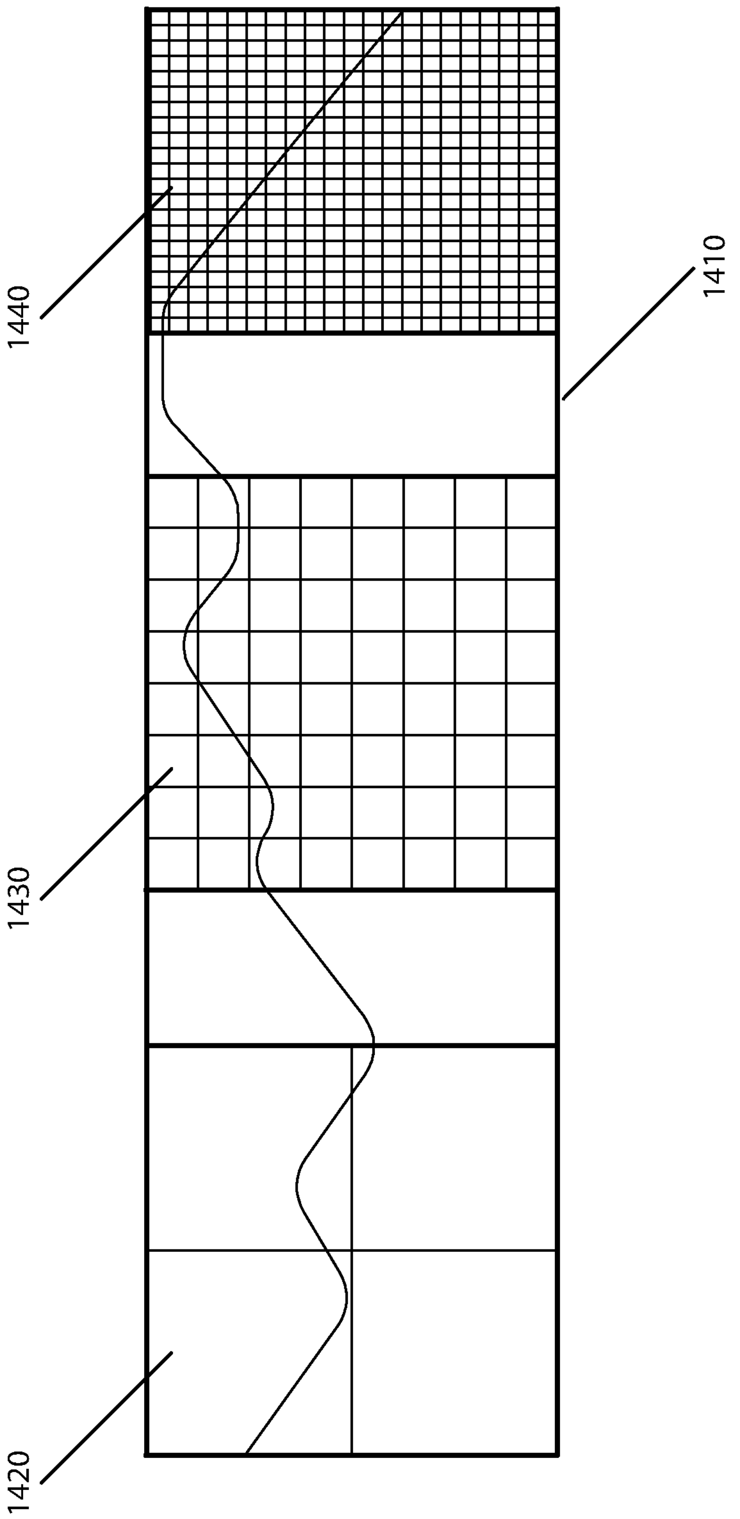
FIG. 14 is an illustration of a two dimensional system of digitization.

FIG. 13 and FIG. 14 are illustrations that show how the key is measured. FIG. 13 is an illustration of a linear system of digitization, showing a low resolution scan 1320, a medium resolution scan 1330, and a high resolution scan 1340. FIG. 14 is an illustration of a two dimensional system of digitization also showing a low resolution scan 1420, a medium resolution scan 1430, and a high resolution scan 1440.

Light that passes from the emitter to the detector is characterized by bright areas highlighted. One representative technique is inspired from the Riemann sum mathematical approach and is performed along the length of the key at the resolution of the detector. Multiple resolutions are possible with higher resolution giving better granularity, but lower resolutions being simpler to implement. The key is scanned in a configurable number of segments. The area of each of those segments is determined by measuring the amount of light registered at the sensor. A string of the segments is constructed with a configurable error or tolerance allowance. The error allowance allows the system to adapt to difference in the allowable keys, alignment variances, and other characteristics that change from reading to reading. The string representation of the digitized portion of the key allows for matching in a database of authorized keys. These predetermined authorized keys may be represented by the predetermined physical properties of those keys. A database lookup of the presented key accounts for the error or tolerance allowance by looking up entries that fit within the range characterized by the string and the error or tolerance allowance.

Figure 15:
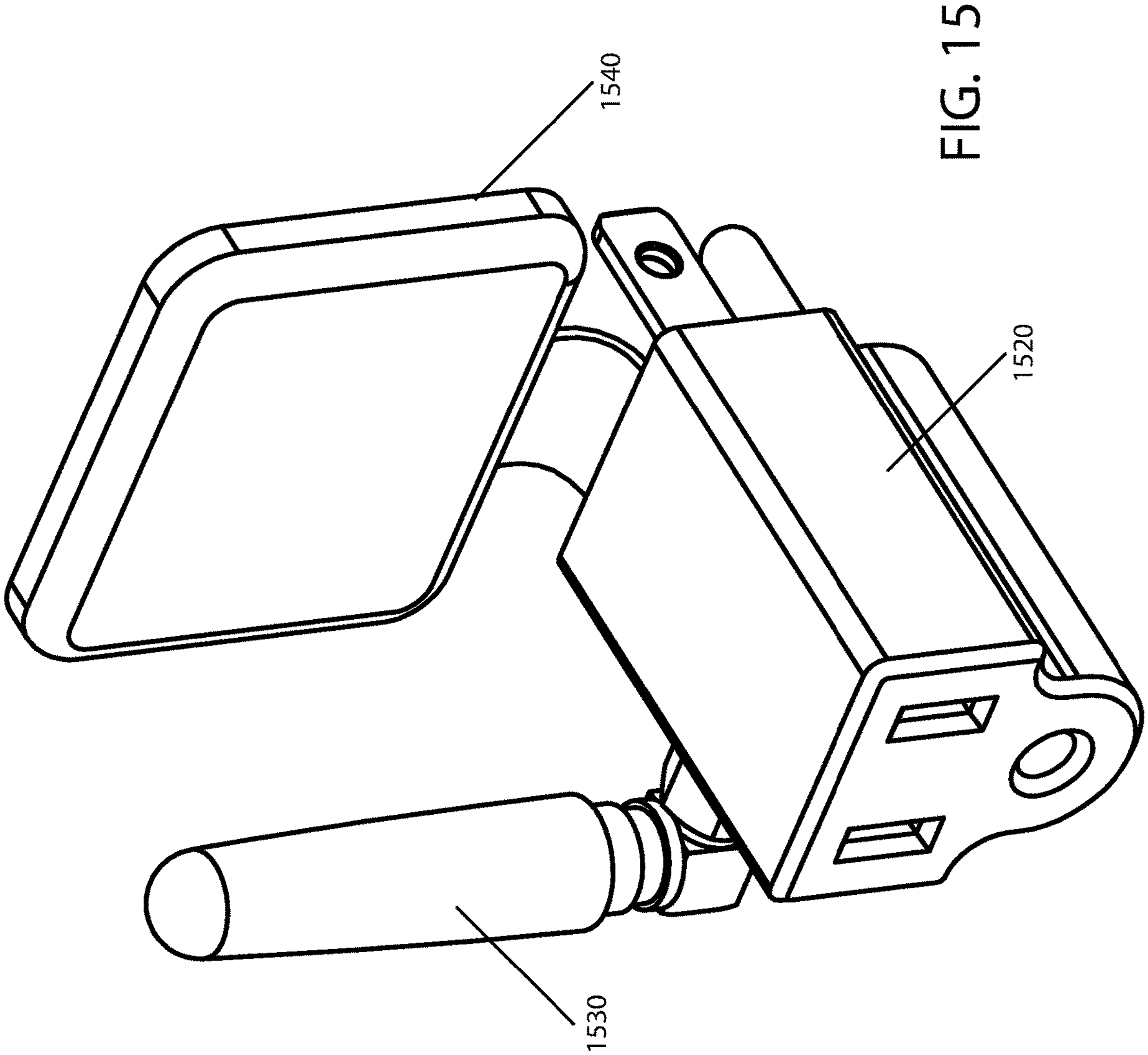
FIG. 15 is an illustration of a Wi-Fi bridge 1520 that may be operatively coupled to a smart cylinder not shown.

FIG. 15 is an illustration of a Wi-Fi bridge 1520 that may be operatively coupled to a smart cylinder not shown. The Wi-Fi bridge 1520 comprises antennae 1530 and antenna 1540. A Wi-Fi bridge 1520 can connect the smart cylinder to a building's wireless internet through a separate digital communication with the smart cylinder. Due to the typical limited range capabilities of these types of digital communication protocols (BLE, Xbee, etc.), it may be necessary for the Wi-Fi bridge 1520 to be plugged into an outlet (such as, but not limited to a standard 120V powerline) within a certain proximity to where the smart cylinder is installed (such as, but not limited to, <2 Meters). The Wi-Fi bridge 1520 presents an opportunity to not only connect the smart cylinder to the internet, but also wirelessly recharge the smart cylinder via inductive charging. The apparent benefit is that the smart cylinder will never have to be either manually recharged, or have batteries replaced within the lifetime of the smart cylinder. In addition to Wi-Fi, a smart cylinder can be powered through a system of harvesting other ambient electromagnetic energy. The smart cylinder can intercept and store the wireless energy used in all manner of digital communication. Incident radiofrequency radiation is received in a smart cylinder antenna and rectified. The resulting power is stored in short or long term storage in a capacitor or battery.

Figure 16:
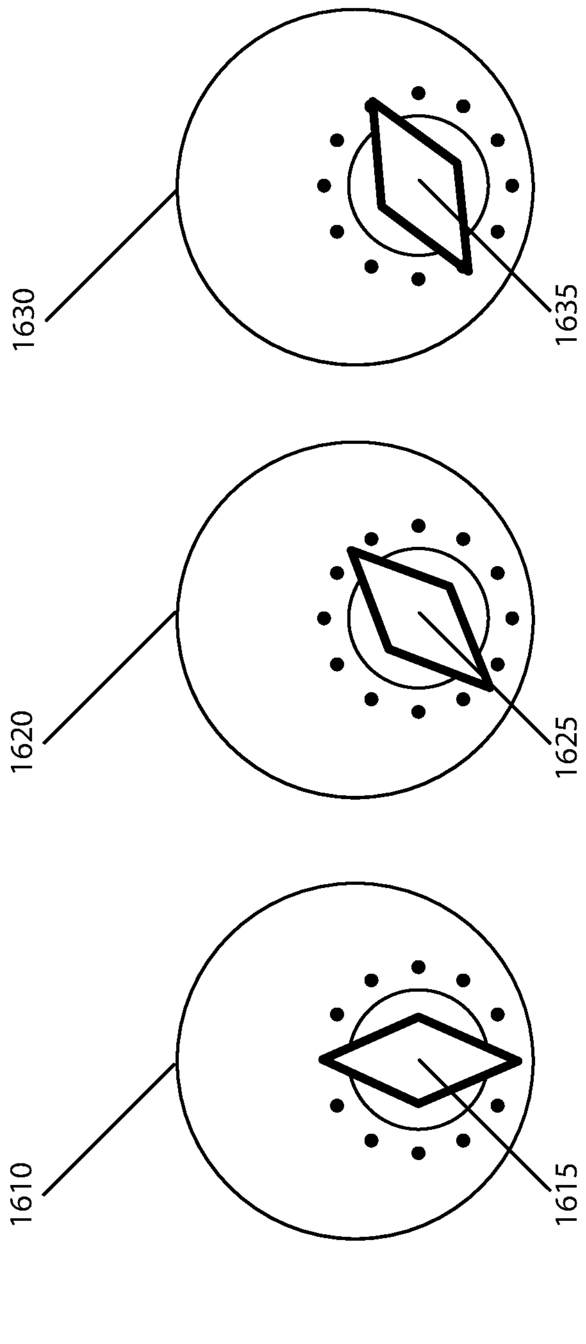
FIG. 16 is an illustration of a smart cylinder where a combination lock forms a part of the unlocking procedure.

FIG. 16 is an illustration of a smart cylinder where a combination lock forms a part of the unlocking procedure. Smart cylinder 1610 shows a knob 1615. Knob 1615 could be a handle that stays with the lock all the time or could be a key that has been inserted into smart cylinder 1610. When knob 1615 is a key, the smart cylinder can verify both that the proper key has been inserted and that the combination lock is entered correctly, thus confirming two separate credentials before engaging the lock. Smart cylinder 1610 is shown in configuration 1620 and configuration 1630 demonstrating when knob 1615 or key is set to knob position 1625 and knob position 1635. The smart cylinder can measure the rotational change in knob 1615 or key, compare the angle of rotation with predetermined values or sequence of values, and engage the lock when the rotations match the predetermined values or sequence of values. Markings on smart cylinder 1610 are shown as dots. However, markings can be made with an active display showing any symbol for each of the markings. In this way, the combination movements can be changed each time a user unlocks the combination.

Figure 17:
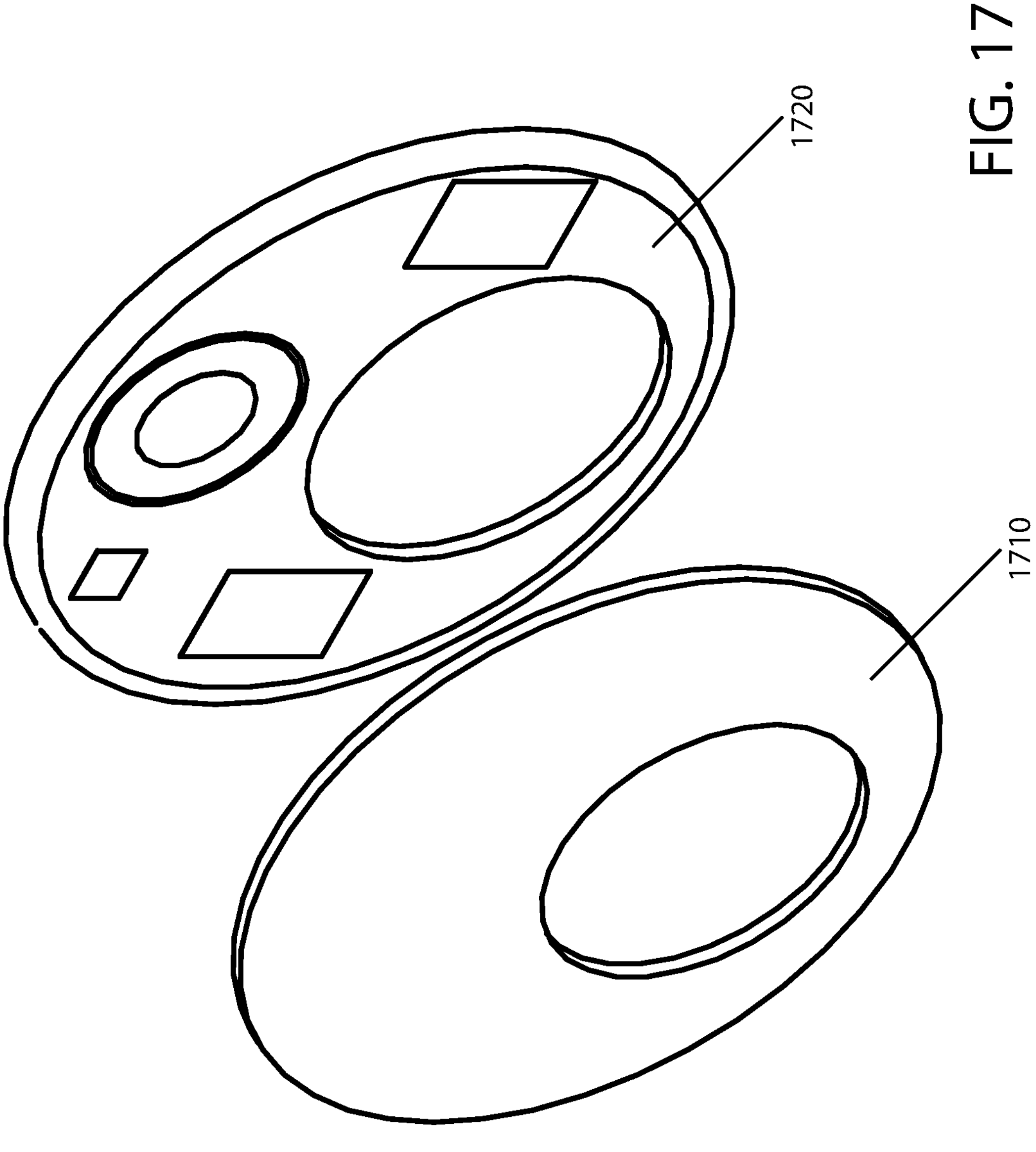
FIG. 17 is an illustration of a faceplate 1710 and communication board 1720 in a smart cylinder system.

FIG. 17 is an illustration of a faceplate 1710 and communication board 1720 in a smart cylinder system. Faceplate 1710 provides protection and a mounting surface for a smart cylinder. A traditional faceplate of a lock is made of metal, sometimes reinforced to make it more difficult to be broken into. A smart lock may need to pass radio-frequency communications, radio-frequency power, light for communication and power to communication board 1720. A plastic faceplate could be used since it can be formed to allow these to pass, but plastic suffers because it is easier to break through and overall less secure.

A smart lock faceplate 1710 can be made with a ceramic face. Ceramics have the advantage of being able to be formed from materials that pass electro-magnetic spectrum wavelengths. Particular materials can be formed that pass radio-frequency or light at specific wavelengths. In addition, ceramics can be formed to be hard and drill resistant to meet and exceed traditional lock faceplate needs.

A smart lock faceplate 1710 may be made from sapphire. Sapphire has a hardness of 9 on the Mohs scale of mineral hardness. Therefore, it is highly resistant to drilling and other forms of tampering. In addition, it will remain scratch free. Sapphire can be formed in industrial processes and formed with diamond tooling. Sapphire is shatter resistant and passes light spectrum better than glass or other alternatives. Typically glass has transmittance wavelengths between 300 nm and 3,000 nm, whereas sapphire has a transmittance between 300 nm and 6,000 nm. This allows sapphire lock faces to cover photovoltaic cells and pass more usable light for energy production than other solutions.

Other materials for a smart lock faceplate X10 can also be used such as zirconia, spinel, yttrium aluminum garnet (YAG), and Yttria. One common ceramic with a high strength and existing supply chain is Zirconium dioxide ($ZrO2$) also called zirconia. This is typically used in consumer products like ceramic knives. Zirconia is an opaque material with a Mohs hardness of greater than 9. Another ceramic that is of interest is magnesium aluminate spinel ($MgAl2O4$) also referred to as spinel. Spinel has a similar optical transmittance range to sapphire, and has uses in transparent armor for military applications. There is a similar ceramic called Yttrium aluminum garnet (YAG) with the chemical form $Y3Al5O12$. YAG has a hardness of 8.5, although the light transmissivity is similar to Sapphire and Spinel from 200 nm to 5,500 nm. Lastly, there is yttrium oxide ($Y2O3$) also called Yttria, which has a greater light transmission spectrum. All these ceramics may be used to create lock faces that are resistant to tampering, each with different advantages.

A smart lock faceplate 1710 can be created with a layering of multiple materials in order to combine the best benefits from each of them. In one example, sapphire can form an outer layer of the smartlock face followed by a layer of plastic as a shock absorber. The smart lock faceplate 1710 may be made of materials that are antimicrobial in their own right, such as, but not limited to, silver, copper, organosilanes. Or smart lock faceplate 1710 material may be an amalgamation of materials that give the hardness or other physical properties desired with antimicrobial characteristics. A smart lock faceplate 1710 that is transparent to ultraviolet radiation (UV), such as sapphire or other material may be lit from behind by UV light emitting diodes (LEDs) to sterilize the faceplate. A passive infrared sensor (PIR) or other sensor technology may be used to determine if people are present such that sterilization is only performed while people are not present. A smart lock faceplate 1710 may be front-lit by UV LEDs by mounting the LEDs in a lock bezel or on a door knob.

Figure 18:
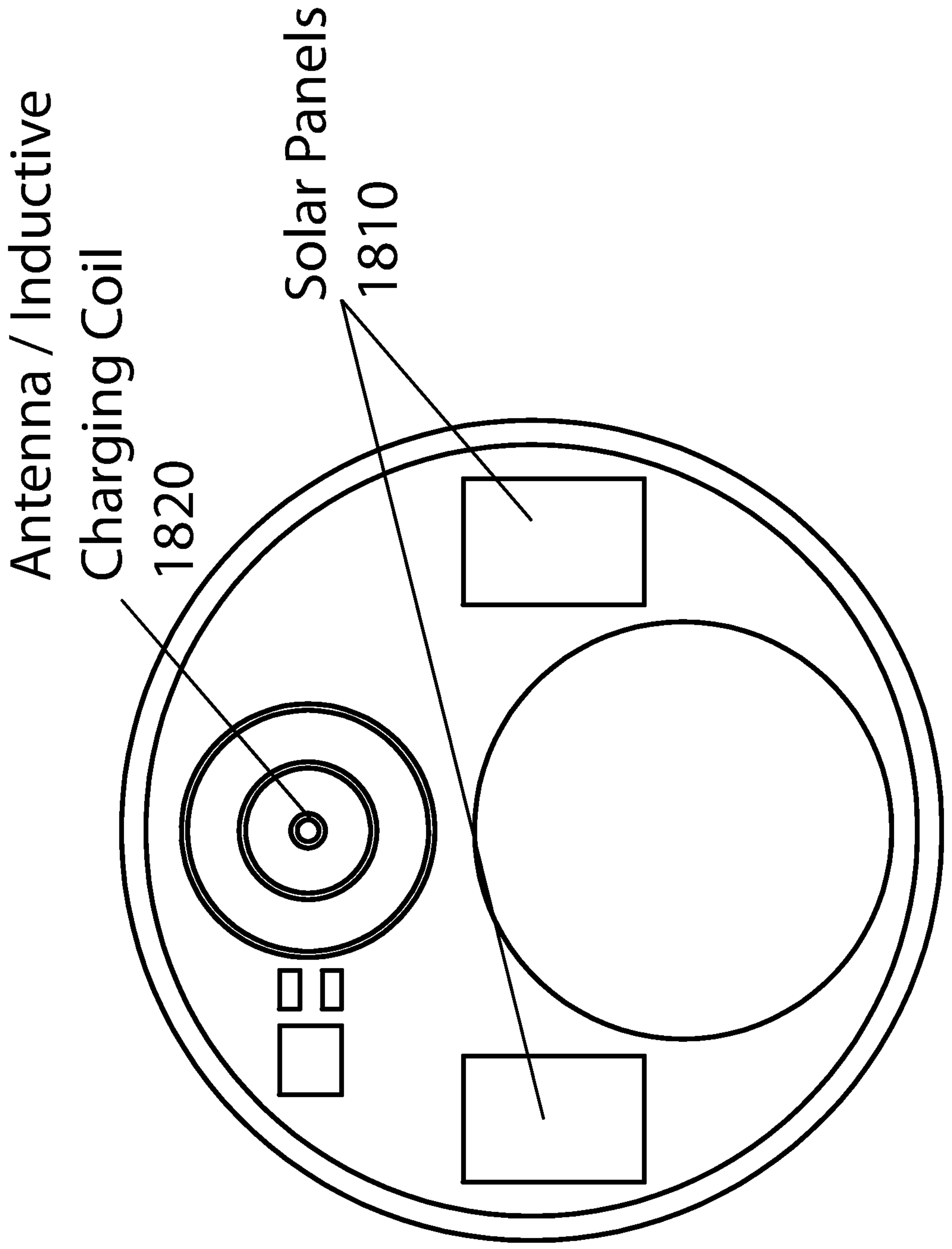
FIG. 18 is a diagram of a smart lock communication board with an integrated solar cell for powering the smart lock.

FIG. 18 is a diagram of a smart lock communication board with an integrated solar cell for powering the smart lock.

Powering smart locks requires both the energy needed to activate the lock and ongoing energy need for steady state operations. It is possible to use a solar cell for these energy needs. Monocrystalline cells have spectral sensitivity range from 300 nm (near-ultraviolet) to 1100 nm (near-infrared), which includes visible light (400 to 700 nm), making them the best solution for indoor use.

Figure 19:
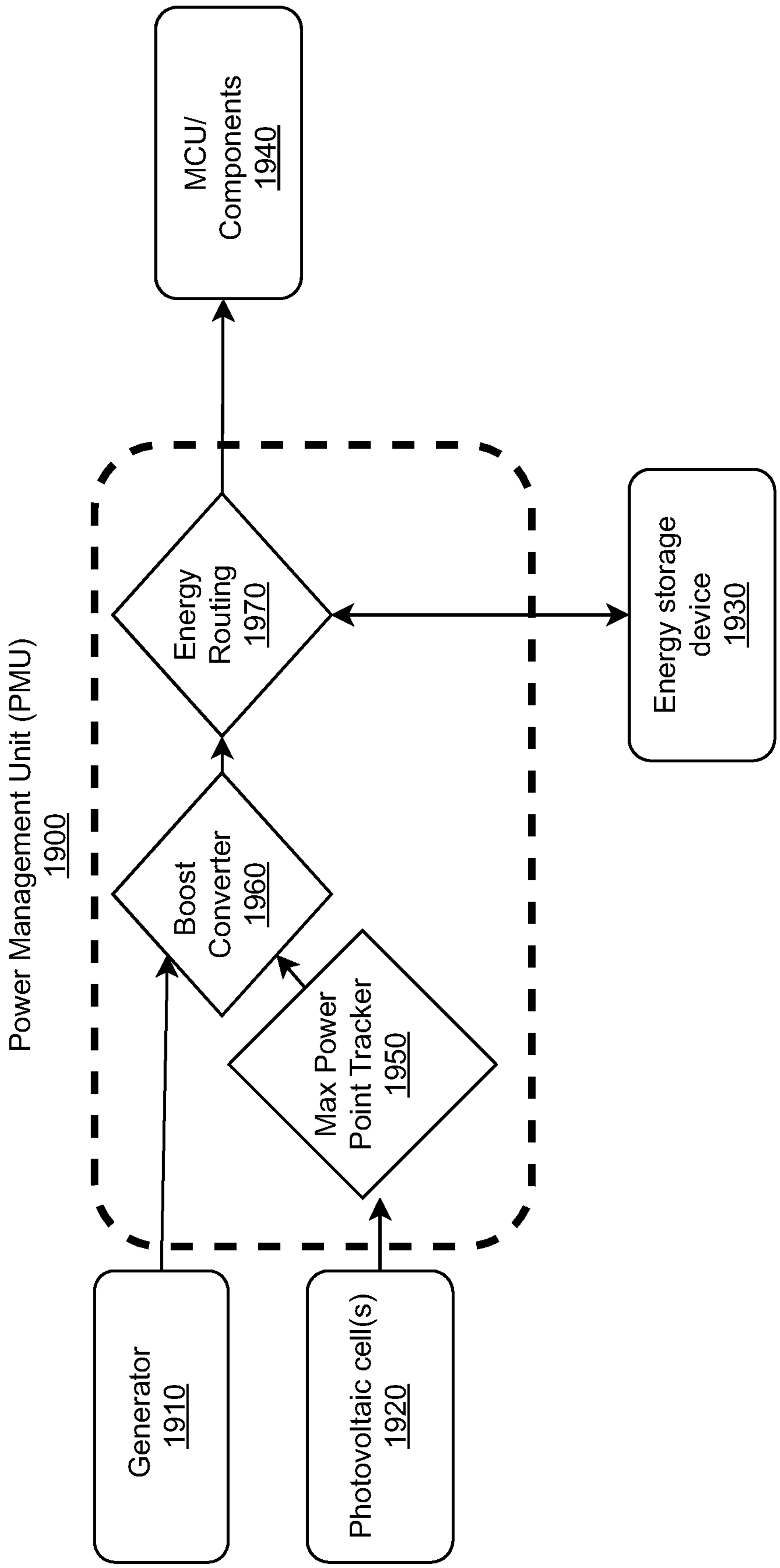
FIG. 19 is a block diagram of a power management unit 1900 for a smart cylinder.

FIG. 19 is a block diagram of a power management unit 1900 for a smart cylinder. A smart lock can be built with multiple power sources. Some examples include, but are not limited to, line power, battery power, super-capacitor power, generator power, solar cell power, radio-frequency harvesting power in an inductive antenna. In the diagram, generator 1910 and photovoltaic cell 1920 are shown, but more sources are possible. These sources can be combined by power management unit 1900. A power management unit (PMU) is needed to switch between various power sources. The smart-lock uses a PMU to intelligently switch between charging from an electromagnetic clutch and solar cells, or to using the battery as the main power source. So a solar cell may be used to charge a super-capacitor or battery, for example. In the diagram, energy storage device 1930 is shown. In one example, a monocrystalline solar cell can be placed directly behind a sapphire smart lock face. This can create a steady source of power that is stored in a super-capacitor or battery until needed by the lock. In the diagram, power management unit 1900 provides power to the micro-controller unit (MCU) and other components 1940. The solar power can top-up the power storage mechanism in between uses of the lock so that more power is available when needed. For lock mechanisms that require more power than can be provided by solar, the overall stored power will slowly decline, but will decline more slowly than if no secondary power sources were available. This can extend overall battery lifetime and limit the number of charging events necessary.

One power management unit that can be used is the ADP5091 from Analog Devices. The power management unit 1900 combines components necessary to use multiple input sources of power. For example, max power point tracker 1950 allows photovoltaic cell 1920 load impedance to be matched such that the maximum amount of power can be extracted. Boost converter 1960 allows the various generated voltages from such sources as generator 1910, photovoltaic cell 1920, and other sources to be converted to a usable voltage. Energy routing 1970 receives power from generator 1910, photovoltaic cell 1920, and energy storage device 1930 and sends it to energy storage device 1930 and MCU/components 1940. This power management solution allows a smart cylinder to efficiently use as many sources of power as are available.

Figure 20:
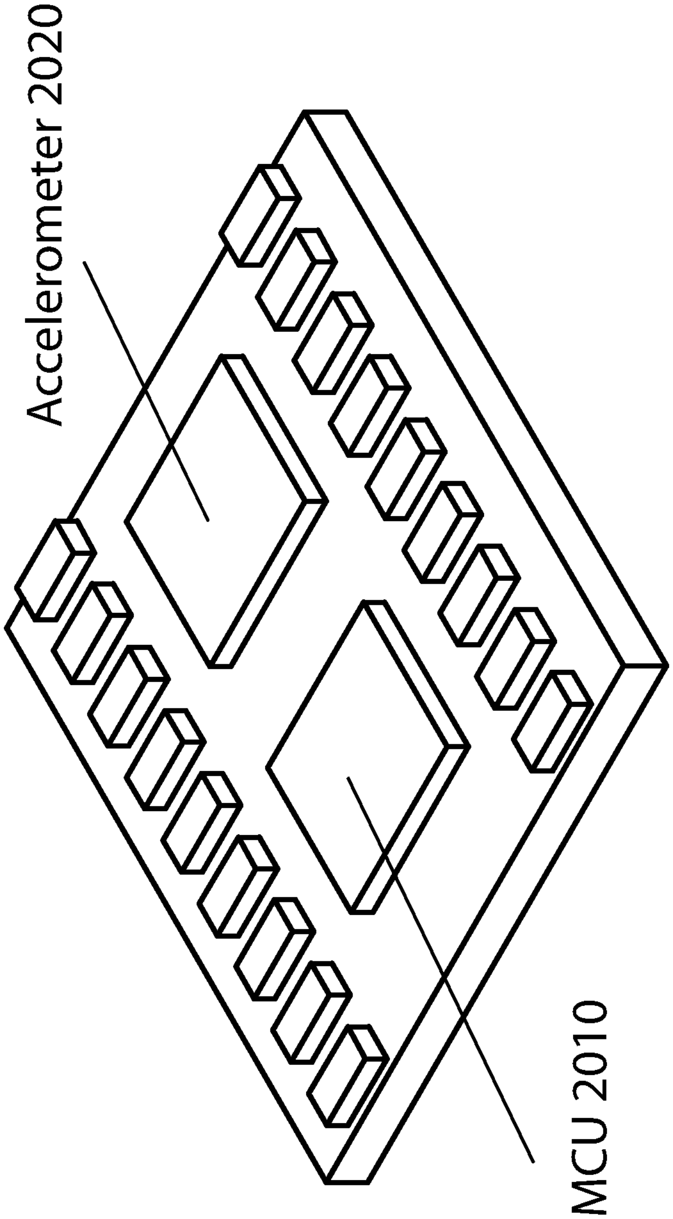
FIG. 20 is an illustration of a smart cylinder control board with a microcontroller unit (MCU) and an internal accelerometer.

FIG. 20 is an illustration of a smart cylinder control board with a microcontroller unit (MCU) 2010 and an internal accelerometer 2020. Accelerometer 2020 can be configured to be part of the lock mechanism. The data produced by accelerometer 2020 can be used by MCU 2010 to monitor normal functioning of the lock—detecting operations that correspond with normal usage of the lock and door that the lock protects. It can also be used to detect tampering behavior—a hammer, a saw, a drill or any other device being used in an unexpected way with the lock. The lock can then send an alert to a remote monitoring system, it can trigger an alarm, or it could activate a failsafe locking mechanism that could make it harder to break through the door. Finally, it can be used to detect unusual locking behavior when any of the mechanical components start to fail. Users and system administrators can then be notified of potential failures of the locking system.

Figure 21:
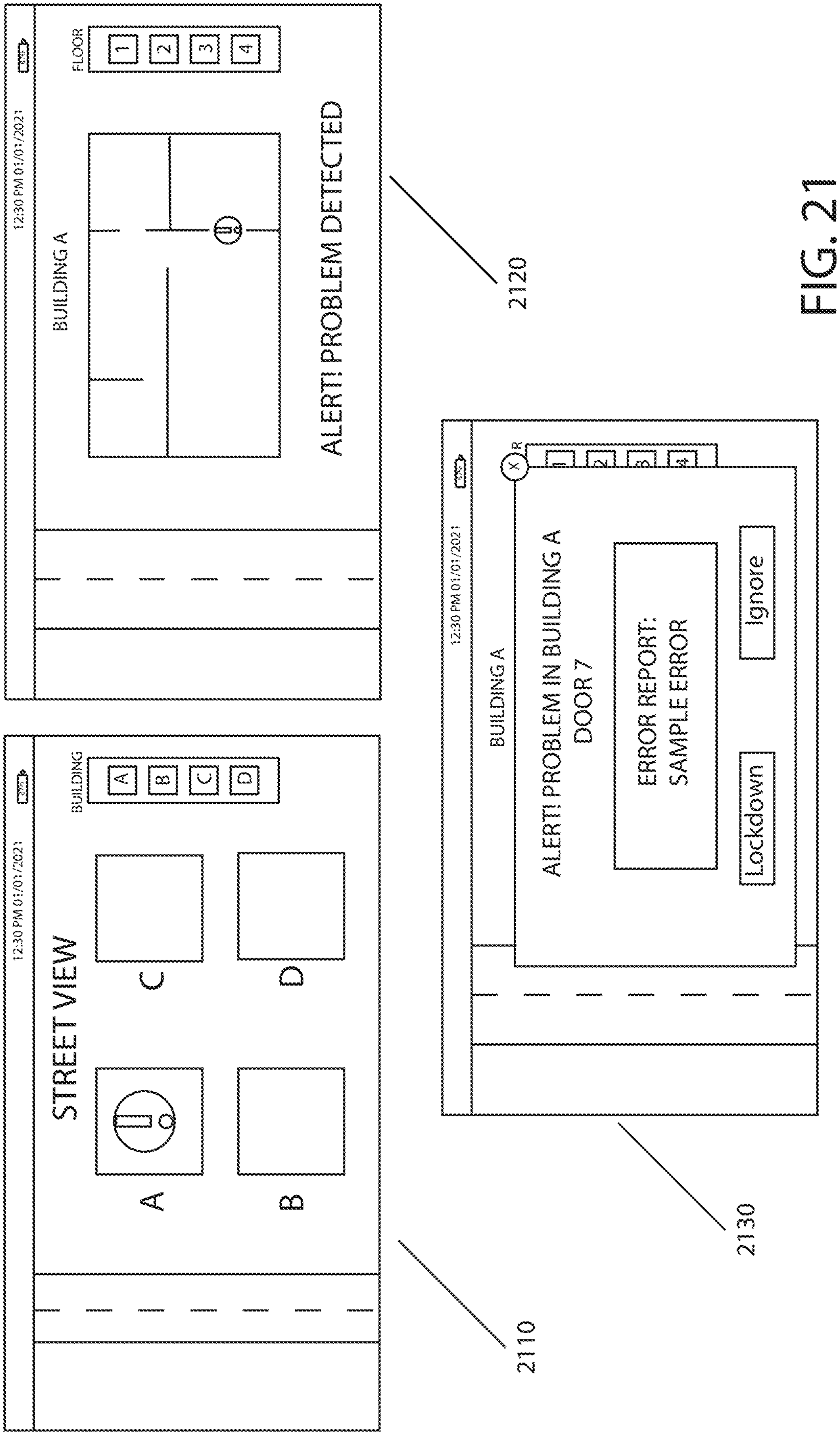
FIG. 21 is an illustration of an interface to a smart lock system that uses an alert map as its primary user interface.

FIG. 21 is an illustration of an interface to a smart lock system that uses an alert map as its primary user interface. A group of smart cylinders and a control system may be configured together into an electronic lock system. The control system may configure individual smart cylinders with database of predetermined values that correspond to the physical keys they are configured to accept. A lock system that implements the smart locks described can interact with users through an Alert Map. An Alert Map is a diagram that shows a layout of the area where a set of locks is installed. Alert map 2110 shows the system at a wide zoom level. Alert map 2120 shows the system zoomed into the inside of one building. Alert map warning 2130 shows how a warning can be overlayed on the map.

In addition to alerts to user administrators, the same system interface is useful to end users as well. The Alert Map allows users to request access to a locked area simply by selecting the locks in interest on the map and pressing a button to request access.

Figure 22:
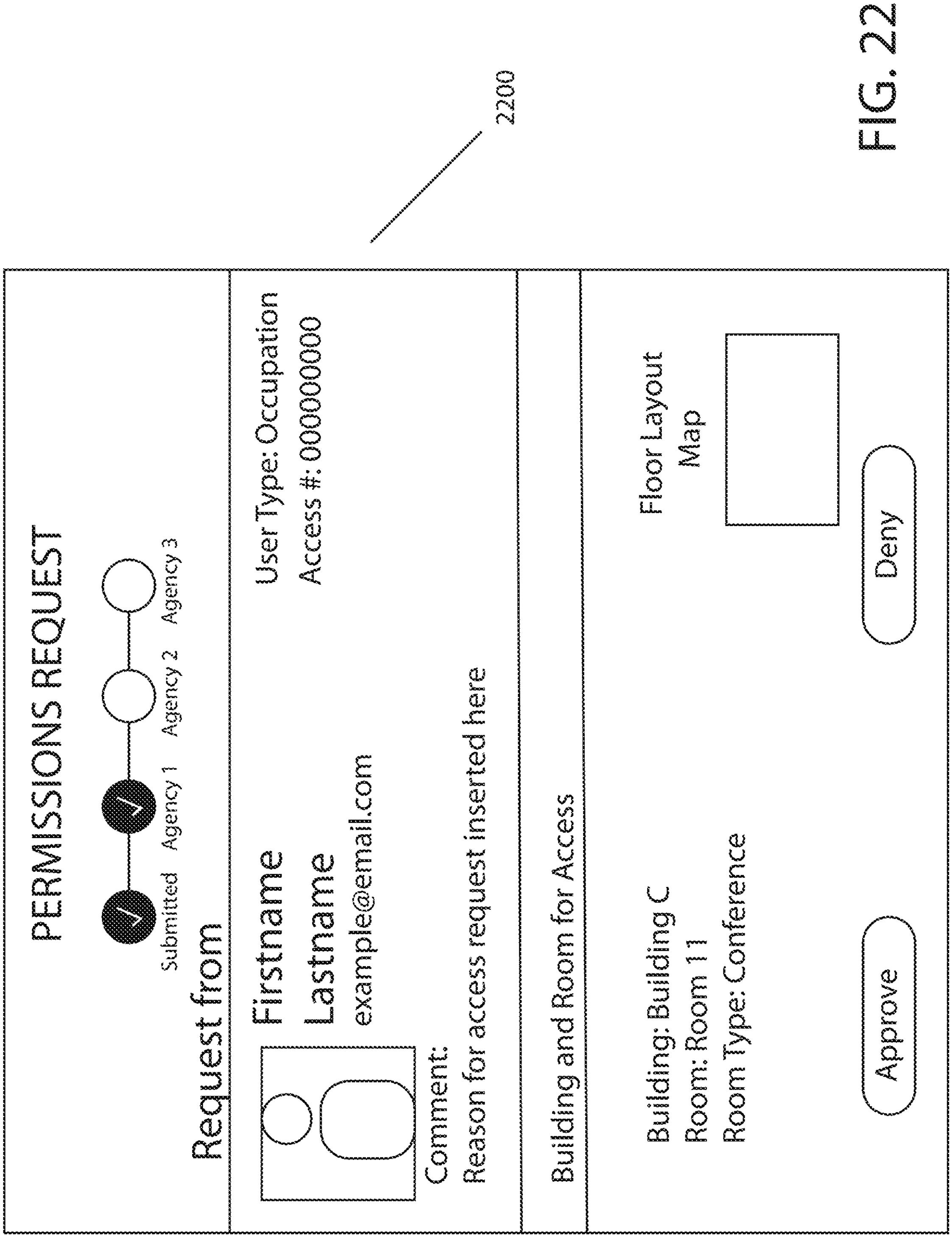
FIG. 22 shows an end user interface 2200 accessed through the alert map of FIG. 21.
Figure 23:
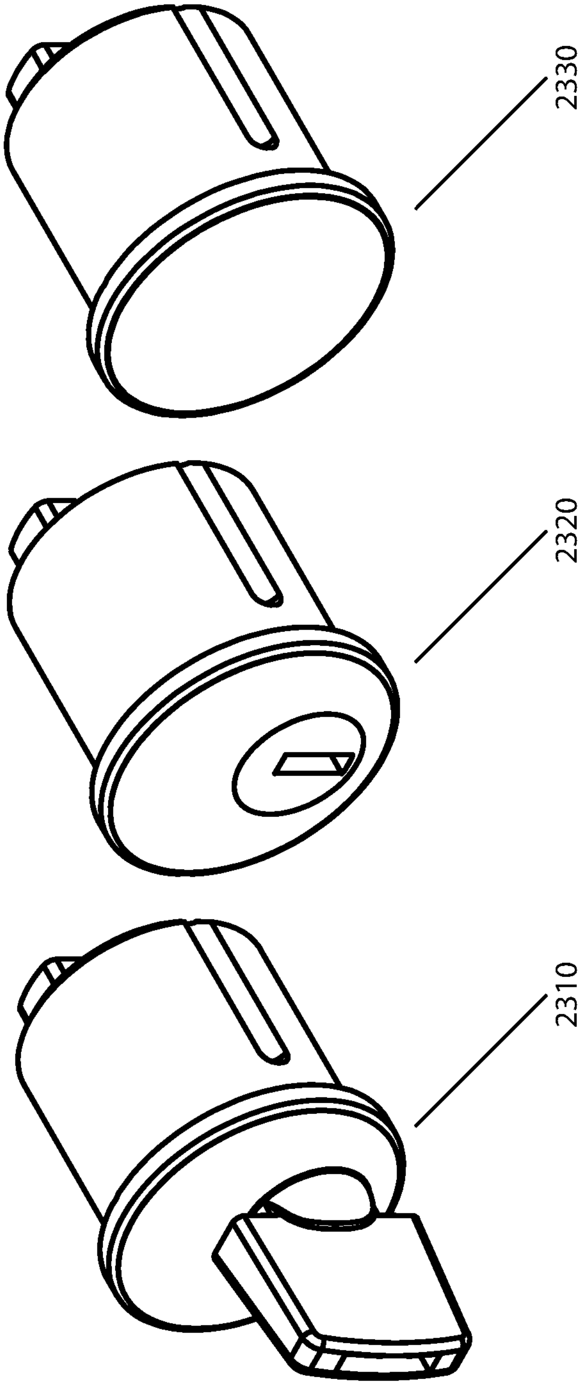
FIG. 23 shows smart cylinders with alternative locking interfaces.

FIG. 22 shows an end user interface 2200 accessed through the alert map of FIG. 21. Fields related to their account, like name, email address, and identification information is filled in automatically. Fields related to the specific lock such as building and room number are filled in when the user selected the lock on the alert map. The user can enter a reason to request access.

A manger of the lock system can then see exactly where the user requested access and can provide that access through a similar interface. When there is a chain of people required for authorization, the request can be passed up through the chain while staying completely in the system. The end user and each agency in the chain of access control can be shown who the request has gone to so they have a better understanding of how soon authorization will be determined. The system is more intuitive and easier to understand when presented as a physical map and leads to fewer mistakes in configuration of the locking system.

All publications and patent applications mentioned in this specification are herein incorporated by reference to the same extent as if each individual publication or patent application was specifically and individually incorporated by reference.

The foregoing description of representative embodiments has been presented for purposes of illustration and description. It is not intended to be exhaustive or to limit the claims to the precise form disclosed, and modifications and variations are possible in light of the above teachings or may be acquired from practice. The embodiments were chosen and described in order to explain the principles of the claims and its practical embodiments to enable one skilled in the art to utilize the claims in various embodiments and with various modifications as are suited to the particular use contemplated.

It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying the principles of the invention. Similarly, it should be appreciated that any flow charts, flow diagrams, signal diagrams, system diagrams, codes, and the like represent various processes which may be substantially represented in computer-readable medium and so executed by a computer or processor, whether or not such computer or processor is explicitly shown. In addition, one or more flow diagrams were used herein. The use of flow diagrams is not intended to be limiting with respect to the order in which operations are performed.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), non-volatile storage, or amalgamations of digital or analog logic. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function or software in any form, including, therefore, firmware, microcode or the like, combined with appropriate circuitry for executing that software to perform the function. The invention as defined herein resides in the fact that the functionalities provided by the various recited means are combined and brought together in the manner which the operational descriptions call for. Applicant regards any means which can provide those functionalities as equivalent as those shown herein.

The invention claimed is:

1. A process performed by a smart cylinder, comprising:

receiving a key;

emitting an energy source of electromagnetic radiation;

detecting a change in the energy source due to a physical property of the key;

determining the physical property of the key from the change in the energy source;

comparing the physical property with a predetermined value;

engaging a mechanism operatively coupled to a locking device that allows the locking device to unlock when the physical property matches the predetermined value;

engaging the mechanism through an electromagnetic device at least partially housed in the smart cylinder; and powering the smart cylinder with energy generated in the electromagnetic device when configured to function as a generator.

2. The process of claim 1 wherein the energy source is light.

3. The process of claim 1 wherein the physical property of the key is the shape of the key.

4. The process of claim 1 wherein the key is designed to work in any combination of a traditional pin-tumbler, a wafer-tumbler, a disc-tumbler, and a lever-tumbler.

5. The process of claim 1, further wherein the energy source is emitted from an energy emission array and wherein the change in the energy source is detected in an energy detection array.

6. The process of claim 1 wherein the energy source is polarized in a polarizing filter.

7. The process of claim 1 wherein the energy source is unique to a particular smart cylinder.

8. The process of claim 1 wherein the key is received in a keyway.

9. The process of claim 1 wherein the change in the energy source is measured in a two-dimensional array of sensors.

10. The process of claim 1 wherein the physical property of the key is the shape of two or more sides of the key.

11. The process of claim 1 wherein the process is performed in a smart cylinder that is designed to fit into a traditional and standardized lock cylinder.

12. The process of claim 1 wherein the change in the energy source is measured in one or more of a pixel sensor, a MXene photodetector, a charged couple device, a Medipix sensor, a complementary metal oxide semiconductor sensor, a photodiode sensor, and a photo-pixel array.

13. The process of claim 1 wherein the change in the energy source measures one or more of the properties of reflection of light off the key, capacitance of an area of the key, and conductivity of an area of the key.

14. A smart cylinder, comprising:

a plug body comprising an energy emitter and an energy detector; and a control module operatively coupled to the energy emitter and the energy detector configured to emit an energy source of electromagnetic radiation from the energy emitter, detect a change in the energy source due to a physical property of a key as received in the energy detector, determine the physical property of the key from the change in the energy source, compare the physical property of the key with a predetermined value, and engage a mechanism operatively coupled to a locking device that allows the locking device to unlock when the physical property matches the predetermined value wherein the mechanism operatively coupled to the locking device is an electromagnetic device at least partially housed in the smart cylinder, wherein the control module is powered from stored energy generated in the electromagnetic device when the electromagnetic device is configured to function as a generator.

15. The smart cylinder of claim 14 wherein the energy source is light.

16. The smart cylinder of claim 14 wherein the physical property of the key is the shape of the key.

17. The smart cylinder of claim 14 wherein the key is designed to work in any combination of a traditional pin-tumbler, a wafer-tumbler, a disc-tumbler, and a level-tumbler.

18. The smart cylinder of claim 14 wherein the energy emitter is comprised of an energy emission array and the energy detector is comprised of an energy detection array.

19. The smart cylinder of claim 14 wherein the energy source is polarized in a polarizing filter.

20. The smart cylinder of claim 14 wherein the energy source is unique to a particular smart cylinder.

21. The smart cylinder of claim 14 wherein the plug body further comprises a keyway.

22. The smart cylinder of claim 14 wherein the change in the energy source is measured in a two-dimensional array of detectors.

23. The smart cylinder of claim 14 wherein the physical property of the key is the shape of two or more sides of the key.

24. The smart cylinder of claim 14 wherein the smart cylinder is configured to fit into a traditional and standardized lock cylinder.

25. The smart cylinder of claim 14 wherein the energy detector is measured in one or more of a pixel sensor, a MXene photodetector, a charged couple device, a Medipix sensor, a complementary metal oxide semiconductor sensor, a photodiode sensor, and a photo-pixel array.

26. The smart cylinder of claim 14 wherein the change in the energy source measures one or more of the properties of reflection of light off the key, capacitance of an area of the key, and conductivity of an area of the key.

27. An electronic lock system, comprising:

a smart cylinder further comprising a plug body comprising an energy emitter and an energy detector;

a control module operatively coupled to the energy emitter and the energy detector configured to emit an energy source of electromagnetic radiation from the energy emitter, detect a change in the energy source due to a physical property of a key as received in the energy detector, determine the physical property of the key from the change in the energy source, compare the physical property of the key with a predetermined value, and engage a mechanism operatively coupled to a locking device that allows the locking device to unlock when the physical property matches the predetermined value wherein the mechanism operatively coupled to the locking device is an electromagnetic device at least partially housed in the smart cylinder, wherein the control module is powered from stored energy generated in the electromagnetic device when the electromagnetic device is configured to function as a generator; and a control system configured to provide the predetermined value to the control module.

28. The electronic lock system of claim 27 wherein the energy source is light.

29. The electronic lock system of claim 27 wherein the physical property of the key is the shape of the key.

30. The electronic lock system of claim 27 wherein the key is designed to work in any combination of a traditional pin-tumbler, a wafer-tumbler, a disc-tumbler, and a level-tumbler.

31. The electronic lock system of claim 27 wherein the energy emitter is comprised of an energy emission array and the energy detector is comprised of an energy detection array.

32. The electronic lock system of claim 27 wherein the energy source is polarized in a polarizing filter.

33. The electronic lock system of claim 27 wherein the energy source is unique to a particular smart cylinder.

34. The electronic lock system of claim 27 wherein the plug body further comprises a keyway.

35. The electronic lock system of claim 27 wherein the change in the energy source is measured in a two-dimensional array of detectors.

36. The electronic lock system of claim 27 wherein the physical property of the key is the shape of two or more sides of the key.

37. The electronic lock system of claim 27 wherein the smart cylinder is configured to fit into a traditional and standardized lock cylinder.

38. The electronic lock system of claim 27 wherein the energy detector is measured in one or more of a pixel sensor, a MXene photodetector, a charged couple device, a Medipix sensor, a complementary metal oxide semiconductor sensor, a photodiode sensor, and a photo-pixel array.

39. The electronic lock system of claim 27 wherein the change in the energy source measures one or more of the properties of reflection of light off the key, capacitance of an area of the key, and conductivity of an area of the key.

* * * * *